(12) United States Patent
    Fackler et al.

(10) Patent No.: US 11,303,425 B2
(45) Date of Patent: Apr. 12, 2022

(54) METHODS AND APPARATUSES FOR AUTOMATIC FILTER IDENTIFICATION

(71) Applicant: CommScope Technologies LLC, Hickory, NC (US)

(72) Inventors: Karl-Heinz Fackler, Wemding (DE); Joerg Stefanik, Donauworth (DE)

(73) Assignee: CommScope Technologies LLC, Hickory, NC (US)

( * ) Notice: Subject to any disclaimer, the term of this patent is extended or adjusted under 35 U.S.C. 154(b) by 122 days.

(21) Appl. No.: 16/794,893

(22) Filed: Feb. 19, 2020

(65) Prior Publication Data

US 2020/0344035 A1  Oct. 29, 2020

Related U.S. Application Data

(60) Provisional application No. 62/837,322, filed on Apr. 23, 2019.

(51) Int. Cl.
| | | |
|---|---|---|
| *H04L 5/14* | (2006.01) | |
| *H04B 1/44* | (2006.01) | |
| *H04B 1/401* | (2015.01) | |
| *H04B 1/12* | (2006.01) | |

(52) U.S. Cl.
  CPC ............... *H04L 5/143* (2013.01); *H04B 1/12* (2013.01); *H04B 1/401* (2013.01); *H04B 1/44* (2013.01)

(58) Field of Classification Search
  CPC .......... H04B 1/12; H04B 10/08; H04B 1/401; H04B 17/00; H04W 24/02; H04W 92/00; H03F 3/24; H04L 5/0048; H04L 5/143
  See application file for complete search history.

(56) References Cited

U.S. PATENT DOCUMENTS

| | | |
|---|---|---|
| 9,712,343 B2 | 7/2017 | Dussmann et al. |
| 9,864,884 B2 | 1/2018 | Stefanik et al. |
| 10,133,892 B2 | 11/2018 | Stefanik et al. |

(Continued)

FOREIGN PATENT DOCUMENTS

| | | |
|---|---|---|
| KR | 101172035 B1 | 8/2012 |
| WO | 2018057725 A1 | 3/2018 |

OTHER PUBLICATIONS

Eslampanah, "Adaptive Duplexer Control for Wireless Transceivers", Submitted in fulfillment of the requirements for the degree of Doctor of Philosophy, Mar. 2016, pp. 1 through 150, College of Engineering and Science, Victoria University.

(Continued)

*Primary Examiner* — Thanh C Le
(74) *Attorney, Agent, or Firm* — Fogg & Powers LLC

(57) ABSTRACT

Methods and apparatuses are provided that configure downlink and uplink signal paths by obtaining information about at least one of a downlink filter and an uplink filter in a duplexer unit after the duplexer unit is coupled to a primary uplink signal path and a primary downlink signal path. Based upon such information, at least one component of the downlink and uplink signal paths is adjusted to compensate for the insertion losses of a downlink filter and an uplink filter, where the downlink signal path comprises a secondary downlink signal path in the duplexer unit and the primary downlink signal path, and the uplink signal path comprises a secondary uplink signal path in the duplexer unit and the primary uplink signal path.

20 Claims, 9 Drawing Sheets

(56) References Cited

U.S. PATENT DOCUMENTS

| | | | |
|---|---|---|---|
| 10,271,380 B2 | 4/2019 | Dussmann et al. | |
| 2004/0085939 A1* | 5/2004 | Wallace | H04L 25/03343 |
| | | | 370/335 |
| 2013/0071112 A1 | 3/2013 | Melester et al. | |
| 2013/0077556 A1 | 3/2013 | Gore et al. | |
| 2013/0083753 A1* | 4/2013 | Lee | H04L 1/0026 |
| | | | 370/329 |
| 2015/0078257 A1* | 3/2015 | Wu | H04J 11/0036 |
| | | | 370/328 |
| 2020/0344035 A1* | 10/2020 | Fackler | H04B 1/401 |
| 2020/0404633 A1* | 12/2020 | Zhou | H04L 5/0053 |
| 2021/0119682 A1* | 4/2021 | Gutman | H04L 5/0044 |

OTHER PUBLICATIONS

International Searching Authority, "International Search Report and Written Opinion from PCT Application No. PCT/US2020/018984", from Foreign Counterpart to U.S. Appl. No. 16/794,893, filed Jun. 12, 2020, pp. 1 through 10, Published: WO.

* cited by examiner

METHODS AND APPARATUSES FOR AUTOMATIC FILTER IDENTIFICATION

CROSS-REFERENCE TO RELATED APPLICATIONS

The present application claims benefit of U.S. Patent Application Ser. No. 62/837,322, filed Apr. 23, 2019; the entire contents of the aforementioned patent application are incorporated herein by reference as if set forth in its entirety.

BACKGROUND

A duplexer is typically used to implement frequency domain duplexing of transmission and reception frequency bands in wireless communications devices. In one common implementation, a duplexer comprises two filters: a downlink (D/L) filter and an uplink (U/L) filter. The duplexer has a common port at which the downlink filter and the uplink filter are coupled. The common port is configured to be coupled to an antenna. The downlink filter and uplink filter typically have frequency bands that are distinct and non-overlapping. The frequency bands of the downlink filter and the uplink filter respectively fall within the downlink and uplink frequency bands that the particular wireless communications device used with the duplexer is configured to support.

One example of such a wireless communications device is a remote antenna unit (RAU) used in a distributed antenna system (DAS). Alternatively, the wireless communications device can be the communications system including the DAS and any cellular base station(s) coupled to the DAS.

A DAS is used to improve the wireless coverage provided by one or more cellular base stations. A DAS typically includes one or more master units that are communicatively coupled to a plurality of remote antenna units. Each remote antenna unit can be coupled directly to one or more of the master units or indirectly via one or more other remote antenna units and/or via one or more intermediary or expansion units. Wireless communications devices such as a DAS may be deployed in many different wireless networks that employ many different frequency bands. To support such variations in frequency bands, the remote antenna units of a DAS can be designed so that the frequencies of the signals transmitted and received by the primary signal paths of the remote antenna units are configurable. Even though the frequencies transmitted and received by the primary signal paths of the remote antenna unit are configurable, the transmit and receive frequency bands of the duplexer typically are not. Thus, remote antenna units that support different frequency bands primarily differ from each other only by the pair of downlink and uplink frequency bands of the duplexers used with those remote antenna units.

Because the insertion loss of the downlink filter and uplink filter of each duplexer unit type (or model) varies, the power level of the signals in the downlink and uplink signal paths of a remote antenna unit typically must be equalized to compensate for such variations. Conventionally, this is accomplished by manufacturing a specific remote antenna unit type (or model) whose downlink and uplink signal path gains have been adjusted to compensate for the variations in duplexer filter insertion loss. As a result, DAS manufacturers typically must make, stock, and sell a unique model of remote antenna unit for each pair of transmit and receive frequency bands, which can be financially inefficient.

SUMMARY

A method for configuring downlink and uplink signal paths is provided. The method comprises: after at least one duplexer unit is coupled to a primary uplink signal path and a primary downlink signal path, receiving duplexer identifier data from each at least one duplexer unit, where each duplexer identifier data comprises at least one of: adjustment data corresponding to the duplexer unit type and an identifier of duplexer unit type, wherein the identifier of duplexer unit type comprises at least one of: at least one measured characteristics of the corresponding duplexer unit and an alphanumeric data identifier, and where the identifier of the duplexer unit type is unique for a corresponding duplexer unit type; if at least one duplexer identifier data does not include adjustment data, then determining adjustment data based upon the corresponding duplexer identifier data; and based upon the adjustment data, automatically sending control signals for affecting adjustment of at least one component of the downlink and uplink signal paths to compensate for the insertion losses of a downlink filter and an uplink filter of each duplexer, where the downlink signal path comprises a secondary downlink signal path in each of the at least one duplexer and the primary downlink signal path, and the uplink signal path comprises a secondary uplink signal path in of the at least one duplexer and the primary uplink signal path.

DRAWINGS

Understanding that the drawings depict only exemplary embodiments and are not therefore to be considered limiting in scope, the exemplary embodiments will be described with additional specificity and detail using the accompanying drawings, in which.

Figure 1:
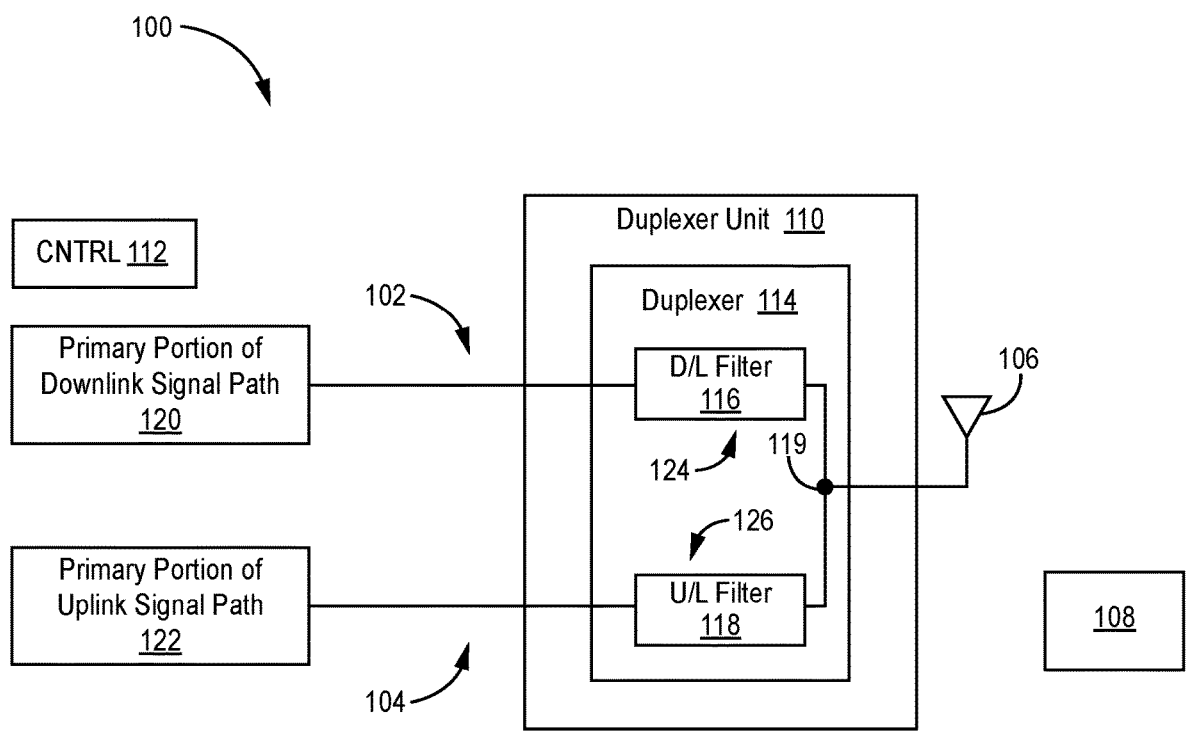
FIG. 1 illustrates a block diagram of one embodiment of a wireless communications device configured to automatically identify a type of duplexer used with the wireless communications device.

Similar element numbers in different figures (except for the first number) correspond to the same component.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

The techniques described below are applicable to any type of communications system, such as a cellular base station such as an LTE eNodeB used in a cellular network or a repeater device (such as a remote antenna unit of a distributed antenna system (DAS) or a single-node repeater). However, for pedagogical reasons, the description of some embodiments is presented below in connection with a remote antenna unit of a DAS. It is to be understood that the techniques described here can be used with other types of wireless communications devices.

FIG. 1 illustrates a block diagram of one embodiment of a wireless communications device 100 configured to automatically identify a type of duplexer used with the wireless communications device 100. The wireless communications device 100 can comprises any communications device that employs a duplexer. Examples of a wireless communications device 100 include, for example, a cellular base station (such as an LTE eNodeB used in a cellular network), a remote antenna unit, and a repeater device (such as a remote antenna unit of a distributed antenna system (DAS) or a single-node repeater). In the illustrated embodiment, the wireless communications device 100 is configured to facilitate wireless communications with user equipment 108 through a downlink signal path 102 and an uplink signal path 104.

The wireless communications device 100 comprises the downlink signal path 102 and the uplink signal path 104. The downlink signal path 102 is configured to output one or more downlink radio frequency signals that are radiated from one or more antennas 106 associated with that device 100 for reception by at least one other wireless communications device 108 (for example, user equipment (UE)). The uplink signal path 104 is configured to receive one or more uplink radio frequency signals transmitted from the one or more other wireless communications devices 108. For example, where the wireless communications device 100 is implemented as a base station or access point, the downlink and uplink signal paths 102 and 104 are configured to perform all Layer-3, Layer-2, and Layer-1 processing and operations required by the relevant wireless interface that are necessary to generate and transmit the downlink radio frequency signals and to receive, demodulate, and decode the uplink radio frequency signals, respectively. In other embodiments where the wireless communications device 100 is implemented as a repeater device (such as a remote antenna unit of a DAS or a single-node repeater), the downlink and uplink signal paths 102 and 104 are configured to perform at least some of the repeater processing or operations necessary to output the downlink radio frequency signals as a repeated version of downlink radio frequency signals originally transmitted by one or more other base stations or access points and to receive the uplink radio frequency signals and output a repeated version of the uplink radio frequency signals that are communicated to the one or more base stations or access points, respectively. As used here, "downlink" refers to the direction of signal flow towards the antenna(s) 106, and "uplink refers to the direction of signal flow from the antenna(s) 106.

The wireless communications device 100 further comprises a duplexer unit 110 and a controller (CNTRL) 112. The controller 112 may also be referred to as controller circuitry.

The duplexer unit 110 includes a duplexer 114 that couples the downlink and uplink signal paths 102 and 104 to the antenna(s) 106 used with that device 100. The wireless communications device 100 is configured so that various types of duplexer units 110 can be coupled to, included in, or otherwise used with the rest of the wireless communications device 100. In general, the duplexer 114 of the duplexer unit 110 can considered to comprises a downlink filter 116 and an uplink filter 118, each having a respective insertion loss. The various types of duplexer units 110 can include duplexers 114 having differing insertions losses for the respective downlink and uplink filters 116 and 118. The downlink filter 116 and uplink filter are coupled at a common node 119 that is coupled to the antenna(s) 106.

The duplexer unit 110 is configured and packaged in such a way that it includes at least a portion of either (or both) of the downlink signal path 102 and the uplink signal path 104. The portions of the downlink and uplink signal paths 102 and 104 that are not included in the duplexer unit 110 are referred to here as the "primary portions" 120 and 122, respectively, of the downlink and uplink signal paths 102 and 104. The portions (if any) of the downlink and uplink signal paths 102 and 104 that are included in the duplexer unit 110 are referred to here as the "secondary portions" 124 and 126, respectively, of the downlink and uplink signal paths 102 and 104. The primary portion of the downlink signal path 120 and the primary portion of the uplink signal path 122 may also be respectively referred to as the primary downlink signal path 120 and the primary uplink signal path. The secondary portion of the downlink signal path 124 and the secondary portion of the uplink signal path 126 may also be respectively referred to as the secondary downlink signal path 120 and the secondary uplink signal path.

The wireless communications device 100 is configured to automatically adjust signal power levels in one or more of the downlink signal path 102 or the uplink signal path 104 in order to compensate for the insertion loss of the duplexer 114 used in the particular type of duplex unit 110 that is being used with the wireless communications device 100. In the embodiment shown in FIG. 1, the controller 112 is configured so as to identify the particular type of duplex unit 110 that is being used with the wireless communications device 100 and to cause adjustments to be made to one or more components in the wireless communications device 100 and/or to one or more external devices. The adjustments are made in order to adjust the power levels in one or both of the downlink signal path 102 or uplink signal path 104 in order to compensate for the insertion loss of the duplexer 114 included in that type of duplex unit 110. For example, in one implementation, the controller 112 causes adjustments to be made to one or more components in one or both of the primary portion 120 of the downlink signal path 102 and the primary portion 122 of the uplink signal path 104 to compensate for the insertion loss of the duplexer 114 included in that type of duplexer unit 110. In another example implementation, the controller 112 causes adjustments to be made to one or more components in one or more of the primary portion 120 of the downlink signal path 102, the secondary portion 124 of the downlink signal path 102, the primary portion 122 of the uplink signal path 104, and the secondary portion of the uplink signal path 104 to compensate for the insertion loss of the duplexer 114 included in that type of duplexer unit 110.

A duplexer unit type means a duplexer unit 110 and/or a duplexer 114 of a specific design having a downlink filter 116 and an uplink filter 118 with respective frequency bands that are unique to the duplexer unit type. Optionally, each of the frequency bands of the downlink and the uplink filter 116 and 118 may be unique to the duplexer unit type. Other embodiments can be implemented in other ways.

Because of such automatic adjustment, manufacturers and their customers can stock a single type of wireless communications device 100 into or with which different types of duplexer units 110 can used, which is more cost efficient. Further, because of such automatic adjustment, operators of the wireless communications device 100 can efficiently change the downlink and uplink bands of the device 100 by replacing corresponding duplexer units 110 in the field.

In one embodiment, a wireless communications device 100 identifies the duplexer unit 110 used with that wireless communications device 100. For example, identification of the duplexer unit 110 can entail determining an identifier for the duplexer unit 110 or the duplexer 114 of the duplexer unit 114 directly or indirectly from the duplexer unit 110. Indirect identification can be facilitated by determining a passband of one or both filters comprising the duplexer 114. In those applications where the various types duplexer filters have unique passbands for each of the downlink filter 116 and the uplink filter 118, determination of at least one filter passband can be used to identify the duplexer unit type, e.g. using a look up table. Where passbands in the downlink and/or uplink filters 116 and 118 are unique and do not overlap, determination of only a portion of the passband, e.g. even a single frequency in a passband, in the corresponding filter(s) can be used to identify the respective filter passband(s) and thus duplexer unit type. Upon determining filter passband(s), one or more adjustments of the type described above can be made to the adjust the signal power of signals in at least one of the downlink and uplink signal paths 102 and 104 to compensate for the insertion loss of one or both of the filters in the duplexer 114 can be determined, e.g. with the look up table. Optionally, upon determining the filter passband(s), the filter type can be identified, e.g. with look up table and/or through a display; filter type data can be provided to system operators and/or maintenance technicians, e.g. for maintenance and record keeping purposes. Optionally, once the corresponding passbands of the downlink filter 116 and the uplink filter 118 of the duplexer units of RAUs of a DAS, or a repeater, are determined, the passbands of the downlink filter 116 and the uplink filter 116 can be used by the DAS and/or base station(s) coupled to the DAS, or by the repeater, to regulate transmission and reception to RF signals in the passbands.

The passband of a filter of a duplexer 114 in a duplexer unit 110 can be determined by measuring over frequency the insertion loss and/or return loss of at least one filter of the duplexer 114. For example, the three-decibel bandwidth of a filter passband, and thus duplexer unit type, can be determined by characterizing return loss and/or insertion loss of a filter of a duplexer 114.

If insertion loss measurements are made for both the uplink and the downlink filters 118 and 116 of a duplexer 114, the measured insertion losses can be used to adjust signal power levels in the downlink signal path 102 and/or the uplink signal path 104. For example, a state function can be utilized to determine signal power level, e.g. gain, adjustments in the downlink and uplink signal paths 102 and 104 based upon the measured insertion losses. Such adjustments may be constant in or vary over the passbands of the filters 116 and 118. Optionally, such adjustments may be made in the primary portion of the downlink signal path 120 and/or the primary portion of the uplink signal path 122. Other embodiments can be implemented in other ways.

Different techniques for determining adjustments to signal power levels in downlink and uplink signal paths 102 and 104 of a wireless communications device 100 will now be described. The embodiments of such techniques will be described as being implemented in a repeater device, more specifically, in a remote antenna unit of a distributed antenna system (DAS). It is to be understood, however, that such embodiments (and the techniques more generally) can be used in other types of repeater devices (for example, single-node repeaters) and in other types of wireless communications equipment (for example, in the remote radio heads or radio points of cellular base station equipment).

Figure 2:
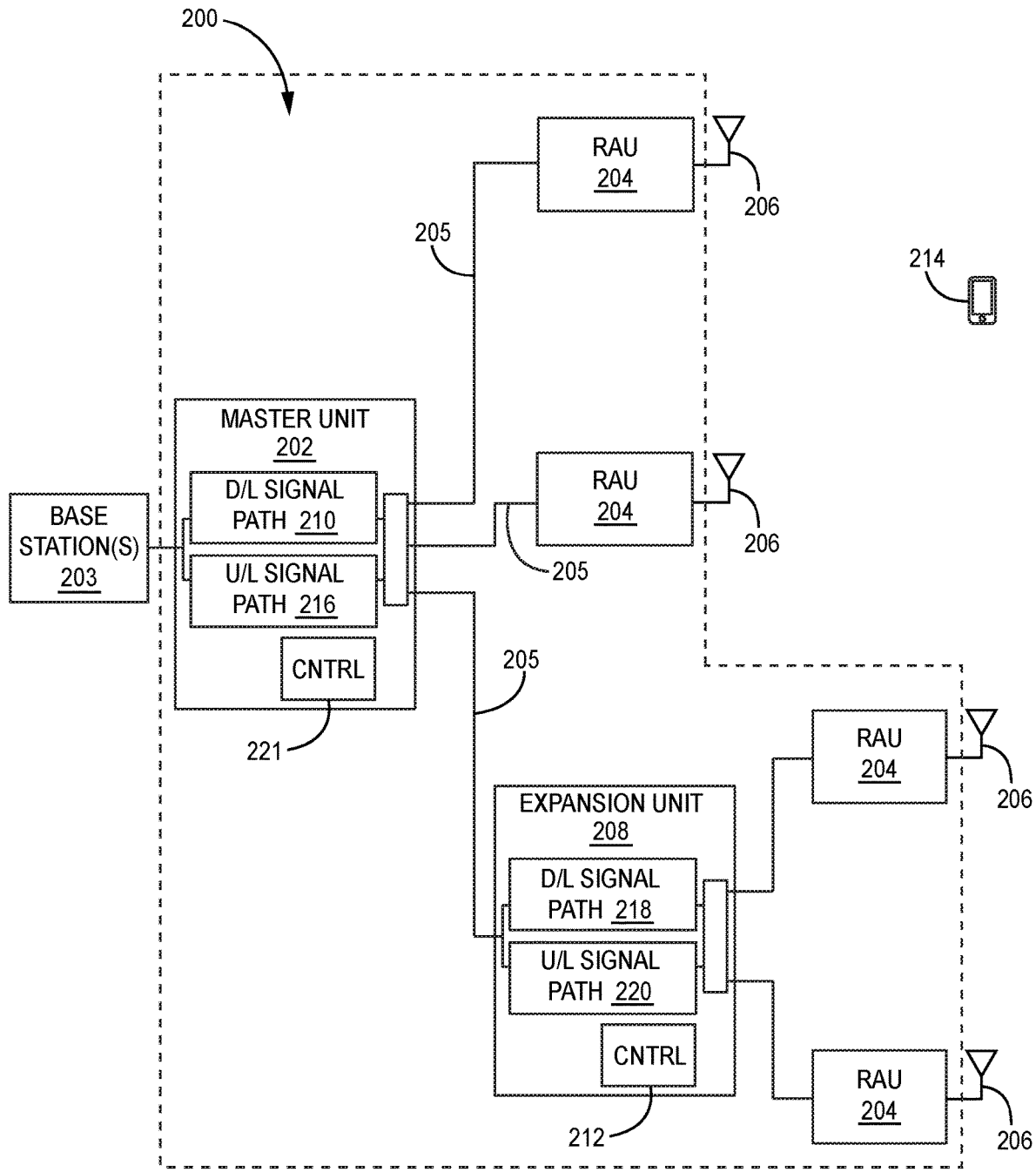
FIG. 2 illustrates a block diagram of one embodiment of a distributed antenna system in which the techniques described here can be used.

FIG. 2 illustrates a block diagram of one embodiment of a distributed antenna system 200 in which the techniques described here can be used. The DAS 200 comprises one or more master units 202 that are communicatively coupled to one or more RAUs 204 via one or more cables 205 e.g. optical or copper cables. Each remote antenna unit 204 can be communicatively coupled directly to one or more of the master units 202 or indirectly via one or more other remote antenna units 204 and/or via one or more expansion (or other intermediary) units 208. Each RAU 204 is configured to be implemented using one of the embodiments described below.

Further, each RAU 204 is configured to be coupled to one or more antennas 206. However, in an alternative embodiment, a RAU may including one or more antennas.

The DAS 200 is coupled to one or more base stations 203 and is configured to improve the wireless coverage provided by the base stations 203. The capacity of each base station 203 can be dedicated to the DAS 200 or can be shared among the DAS 200 and a base station antenna system that is co-located with the base stations 203 and/or one or more other repeater systems.

In the embodiment shown in FIG. 2, the capacity of one or more base stations 203 are dedicated to the DAS 200 and are co-located with the DAS 200. The base stations 203 are coupled to the DAS 200. It is to be understood however that other embodiments can be implemented in other ways. For example, the capacity of one or more base stations 203 can be shared with the DAS 200 and a base station antenna system co-located with the base stations 203 (for example, using a donor antenna). The base stations 203 can include one or more base stations that are used to provide commercial cellular wireless service and/or one or more base stations that are used to provide public and/or private safety wireless services (for example, wireless communications used by emergency services organizations (such as police, fire and emergency medical services) to prevent or respond to incidents that harm or endanger persons or property).

The base stations 203 can be coupled to the master units 202 using a network of attenuators, combiners, splitters, amplifiers, filters, cross-connects, etc., (sometimes referred to collectively as a "point-of-interface" or "POI"). This network can be included in the master units 202 and/or can be separate from the master units 202. This is done so that, in the downlink, the desired set of RF channels output by the base stations 203 can be extracted, combined, and routed to the appropriate master units 202, and so that, in the upstream, the desired set of carriers output by the master units 202 can be extracted, combined, and routed to the appropriate interface of each base station 203. It is to be understood, however, that this is one example and that other embodiments can be implemented in other ways.

In general, each master unit 202 comprises a downlink signal path 210 that is configured to receive one or more downlink signals from one or more base stations 203. Each base station downlink signal includes one or more radio frequency channels used for communicating in the downlink direction with user equipment 214 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPR") protocol, Open Radio Equipment Interface ("ORP") protocol, the Open Base Station Standard Initiative ("OBSAI") protocol, or other protocol). The downlink signal path 210 in each master unit 202 is also configured to generate one or more downlink transport signals derived from one or more base station downlink signals and to transmit one or more downlink transport signals to one or more of the remote antenna units 204.

Each RAU 204 is configured to receive the downlink transport signals transmitted to it from one or more master units 202 and to use the received downlink transport signals to generate one or more downlink radio frequency signals that are radiated from one or more antennas associated with that remote antenna unit 204 for reception by user equipment 214. In this way, the DAS 200 increases the coverage area for the downlink capacity provided by the base stations 203.

Also, each RAU 204 is configured to receive one or more uplink radio frequency signals transmitted from the user equipment 214. These signals are analog radio frequency signals.

Each RAU 204 is also configured to generate one or more uplink transport signals derived from the one or more remote uplink radio frequency signals and to transmit one or more uplink transport signals to one or more of the master units 202.

Each master unit 202 comprises an uplink signal path 216 that is configured to receive the respective uplink transport signals transmitted to it from one or more RAUs 204 and to use the received uplink transport signals to generate one or more base station uplink radio frequency signals that are provided to the one or more base stations 203 associated with that master unit 202. Typically, this involves, among other things, combining or summing uplink signals received from multiple RAUs 204 in order to produce the base station signal provided to each base station 203. In this way, the DAS 200 increases the coverage area for the uplink capacity provided by the base stations 203.

Each expansion unit 208 comprises a downlink signal path 218 that is configured to receive the downlink transport signals transmitted to it from the master unit 202 (or other expansion unit 208) and transmits the downlink transport signals to one or more RAUs 204 or other downstream expansion units 208. Each expansion unit 208 also comprises an uplink signal path 220 that is configured to receive the respective uplink transport signals transmitted to it from one or more RAUs 204 or other downstream expansion units 208, combine or sum the received uplink transport signals, and transmit the combined uplink transport signals upstream to the master unit 202 or other expansion unit 208. In other embodiments, one or more remote antenna units 204 are coupled to one or more master units 202 via one or more other remote antenna units 204 (for example, where the remote antenna units 204 are coupled together in a daisy chain or ring topology).

The downlink signal paths 210 and 218 and uplink signal paths 216 and 220 in each master unit 202 and expansion unit 208, respectively, can be implemented using appropriate circuitry. Thus, the downlink signal paths 210 and 218 can also each be referred to as "downlink circuitry" or "downlink DAS circuitry" 210 and 218, and the uplink signal paths 216 and 220 can also each be referred to as "uplink circuitry" or "uplink DAS circuitry" 216 and 220. The downlink signal paths 210 and 218 and the uplink signal paths 216 and 220 can comprise one or more appropriate connectors, attenuators, combiners, splitters, amplifiers, filters, duplexers, transmit/receive switches, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the respective downlink and uplink signal paths in each of the mater units 202 and expansion units 208 may share common circuitry and/or components.

The DAS 200 can use digital transport, analog transport, or combinations of digital and analog transport for generating and communicating the transport signals between the master units 202, the remote antenna units 204, and any expansion units 208. Each master unit 202 and expansion unit 208 in the DAS 200 also comprises a respective controller (CNTRL) 212 (or controller circuitry). The controller 212 is implemented using one or more programmable processors that execute software that is configured to implement the various control functions.

In embodiments of the invention described herein, certain components, e.g. controllers, look up tables, power supplies, and current sensors, are illustrated as being incorporated in a specific section of a communications system, e.g. a RAU of a DAS. However, such components may be located in other sections of the corresponding communications system, e.g. in a master unit, expansion unit, and/or a base station.

Figure 3:
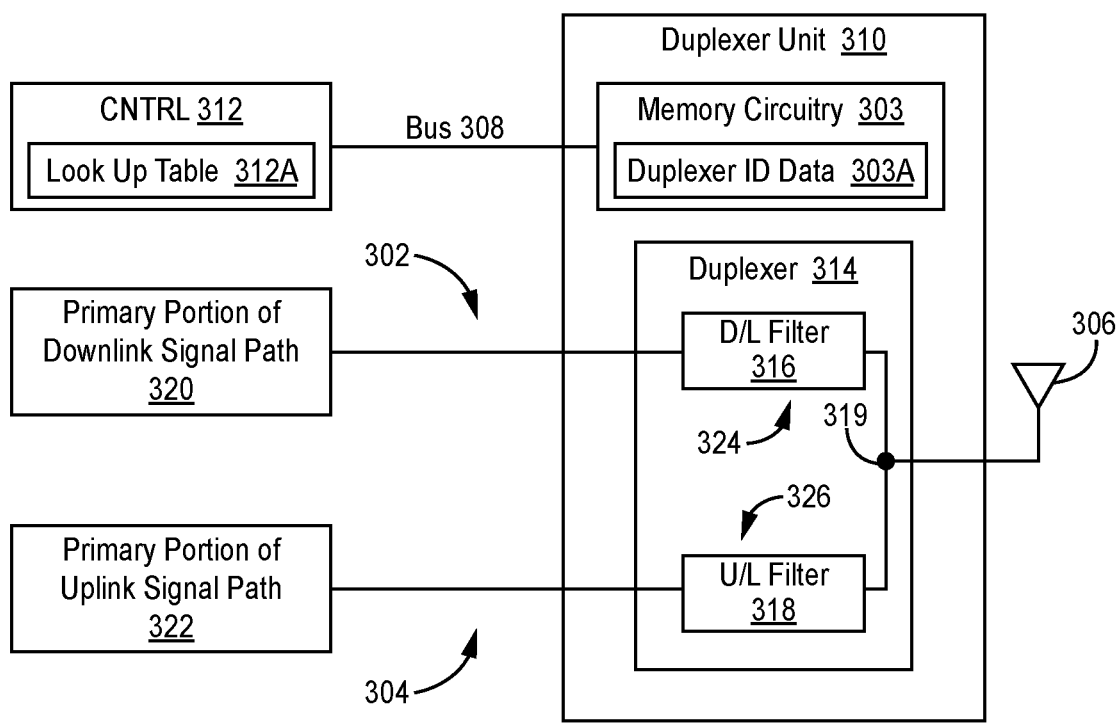
FIG. 3 illustrates a block diagram of one embodiment of a remote antenna unit configured to automatically identify a type of the duplexer.

FIG. 3 illustrates a block diagram of one embodiment of a remote antenna unit 300 configured to automatically identify a type of the duplexer. The remote antenna unit 300 can be used in a DAS of the type described above in connection with FIG. 2 (though it is to be understood that the remote antenna unit 300 can be used in other embodiments).

The remote antenna unit 300 comprises a downlink signal path 302 and an uplink signal path 304. The downlink signal path 302 is configured to receive downlink transport signals transmitted to it from one or more master units of a DAS (for example, one or more master units 202 shown in FIG. 2) and to use the received downlink transport signals to generate and amplify one or more downlink radio frequency signals that are radiated from one or more coverage antennas 306 associated with that remote antenna unit 300 for reception by user equipment. The uplink signal path 304 is configured to receive one or more uplink radio frequency signals transmitted from the user equipment, generate one or more uplink transport signals derived from the one or more remote uplink radio frequency signals, and transmit the one or more uplink transport signals to one or more of the master units.

The remote antenna unit 300 further comprises a duplexer unit 310 and a controller (CNTRL) 312 (or controller circuitry). The duplexer unit 310 includes a duplexer 314 that couples the downlink and uplink signal paths 302 and 304 to the antennas 306 used with that remote antenna unit

300. The remote antenna unit 300 is configured so that various types of duplexer units 310 coupled to, included in, or otherwise used with the rest of the remote antenna unit 300. In general, the duplexer 314 of the duplexer unit 310 can considered to comprises a downlink filter 316 and an uplink filter 318, each having a respective insertion loss. The various types of duplexer units 310 can include duplexers 314 having differing insertions losses for the respective downlink and uplink filters 316 and 318. The downlink filter 316 and uplink filter 318 are coupled by a common node 319 coupled to at least one antenna 306.

The remote antenna unit 300 is configured to automatically adjust power levels in one or both of the downlink signal path 302 or uplink signal path 304 in order to compensate for the insertion loss of the duplexer 314 included in the particular type of duplex unit 310 that is being used with the remote antenna unit 300. In the embodiment shown in FIG. 3, the controller 312 is configured so as to identify the particular type of duplex unit 310 that is being used with the remote antenna unit 300 and to cause adjustments to the power levels in one or both of the downlink signal path 302 and the uplink signal path 304 to be made in order to compensate for the insertion loss of the duplexer 314 included in that type of duplexer unit 310.

The duplexer unit 310 comprises a secondary downlink signal path 324 and a secondary uplink signal path 326. The portions of the downlink and uplink signal paths 302 and 304 that are not included in the duplexer unit 310 are referred to here as the "primary portions" 320 and 322, respectively, of the downlink and uplink signal paths 302 and 304. The portions (if any) of the downlink and uplink signal paths 302 and 304 that are included in the duplexer unit 310 are referred to here as the "secondary portions" 324 and 326, respectively, of the downlink and uplink signal paths 302 and 304.

In this embodiment, the remote antenna unit 300 is configured to receive duplexer identifier data 303A stored in memory circuitry 303 of the duplexer unit 310, and affects adjustments, corresponding to the duplexer identifier data 303A, in component(s) of the downlink signal path 302 and/or the uplink signal path 304 to compensate for insertion loss(es) of the downlink filter 316 and/or the uplink filter 318 of the duplexer unit 310. In one embodiment, the duplexer identifier data 303A comprises at least one of adjustment data which can be used by the controller 312 to affect the adjustments to compensate for insertion loss(es), and an identifier of the duplexer unit type. The identifier of duplexer unit type comprises at least one of: at least one measured characteristics of the duplexer, and an alpha numeric data identifier. The identifier of the duplexer unit type is unique for the corresponding duplexer unit type.

The adjustment data comprises information such as insertion losses of the filters and/or gain offsets for equalization circuitry (e.g. amplifier(s)) in the downlink and/or uplink paths. Optionally, in another embodiment, if the duplexer identifier data comprises only adjustment data, then the controller 312 comprises a look up mechanism, e.g. a look up table 312A, that identifies duplexer unit type based upon such adjustment data. Alternatively, if in a further embodiment, if the duplexer identifier data comprises an identifier of duplexer unit type but not adjustment data, then the controller 312 comprises the look up mechanism, e.g. the look up table, that identifies adjustment data based upon duplexer identifier data; such adjustment data is used to affect the adjustments. The identifier of the duplexer unit type may be measured characteristics of the duplexer (such as return loss and/or insertion loss of at least one filter of the duplexer, duplexer PIMD characteristics, characteristics of current drawn by, e.g. a low noise amplifier (LNA) in, the duplexer, and/or a regulated voltage level provided by the duplexer), or the alpha numeric identifier. (Note, in other embodiments, the LNA may be located in the primary uplink signal path.) Such identifier of duplexer unit type is uniquely associated with one duplexer unit type. Optionally, the adjustment data may be an identifier of duplexer unit type if it is uniquely associated with one duplexer unit type.

In one embodiment, the controller 312 comprises a look up mechanism, e.g. a look up table 312A, which comprises duplexer unit type identifiers and corresponding adjustments to signal power level in the downlink signal path 302 and/or the uplink signal path 304. Each duplexer unit type identifier corresponds to a unique duplexer unit type. The controller 312A is configured to be coupled to at least one of equalizer circuitry, the primary uplink signal path 322, and the primary downlink signal path 320. The controller 312 is configured to vary signal power level in the uplink signal path 302 and the downlink signal path 304 by varying the gain based upon the adjustment data. The controller 312 is configured to be coupled, e.g. to at least one of the equalizer circuitry, the primary uplink signal path 304, the primary downlink signal path 302; the controller 312 may vary signal power level by adjusting the gain of component(s) in one or more of the equalizer circuitry, the primary uplink signal path 304, the primary downlink signal path 302. Optionally, the controller 312 can be coupled to an LNA optionally located in the duplexer unit 310, and can adjust signal power level, at least in part, in the primary uplink signal path 322 by adjusting the gain of the LNA. The equalizer circuitry may be located in the duplexer unit 310, or in another component of the DAS or another part of the communications system, such as in the extension unit, the master unit, or the base station. The equalizer circuitry may comprise analog and/or digital circuitry such as amplifiers and/or filters. The techniques, described in the foregoing text of this paragraph, may apply to other embodiments of the invention.

The duplexer unit 310 comprises a duplexer 314 and memory circuitry 303. The duplexer 314 comprises a downlink filter 316 coupled to an uplink filter 318 at a common node 318. Optionally, the duplexer unit 310 comprises a low noise amplifier coupled between the output port of the uplink filter 318 and the output port of the duplexer 310; thus, the output port of the LNA is configured to be coupled to the input port of the primary uplink signal path 322. The output port of the downlink filter 316 and the input port of the uplink filter 318 are coupled together at the common port 319. The common port 319 of the duplexer unit 310 is configured to be coupled to the at least one antenna 306.

The memory circuitry 303 comprises a duplexer identifier (ID) data 303A. Optionally, each duplexer unit type has a unique duplexer identifier data.

A bus 308, e.g. a data bus, is configured to be coupled between the duplexer unit 310, and thus the memory circuitry 303, and the controller 312. The bus 308, for example, may be a one wire or two wire bus. Optionally, the bus 308 or other wiring is configured to carry, e.g. direct current (DC), to the memory circuitry 303 to power the memory circuitry 303. Upon coupling the bus 308 to the duplexer unit 310, the controller 312 is configured to read the duplexer identifier data 303A, determine the adjustments to signal power level in the downlink signal path 302 and/or the uplink signal path 304 of the remote antenna unit 300, and then affect such adjustments. Optionally, the adjustments are determined by extracting adjustment data (corresponding to the type of adjustments to be made and/or identifying the equipment in which the adjustments will be made)—associated with the read duplexer identifier data 303A—from the look up table 312A.

In another embodiment, the memory circuitry 303 and the duplexer identifier data 303A can be replaced by a voltage regulator such as a low drop out voltage regulator or a Zener diode providing a regulated voltage level. Each duplexer unit type has a corresponding unique voltage level. In this embodiment, the controller 312 is configured to supply DC power over the bus 308 to the voltage regulator and having a voltage higher than the regulated voltage level; the controller 312 is further configured to measure the regulated voltage on the bus 308. When the controller 312 is coupled to the voltage regulator, voltage on the bus 308 drops from a higher supplied voltage to a lower regulated voltage. For example, the controller 312 can be triggered to measure the voltage upon detecting such a voltage drop; however, the trigger can be implemented in other ways. Upon coupling the bus 308 to the duplexer unit 310, the controller 312 is configured to measure the regulated voltage, determine the adjustments to signal power level in the downlink signal path 302 and/or the uplink signal path 304 of the remote antenna unit 300 based upon the measured voltage and in a manner similar to that described above. Optionally, when the duplexer identifier data 303A does not include duplexer unit type, the look up table 312A comprises duplexer unit type corresponding to each duplexer identifier data 303A.

The memory circuitry 303 and the voltage regulator may be generally referred to herein as duplexer identification circuitry. The duplexer identifier data 303A and the regulated voltage may be generally referred to as duplexer identifiers.

Figure 4:
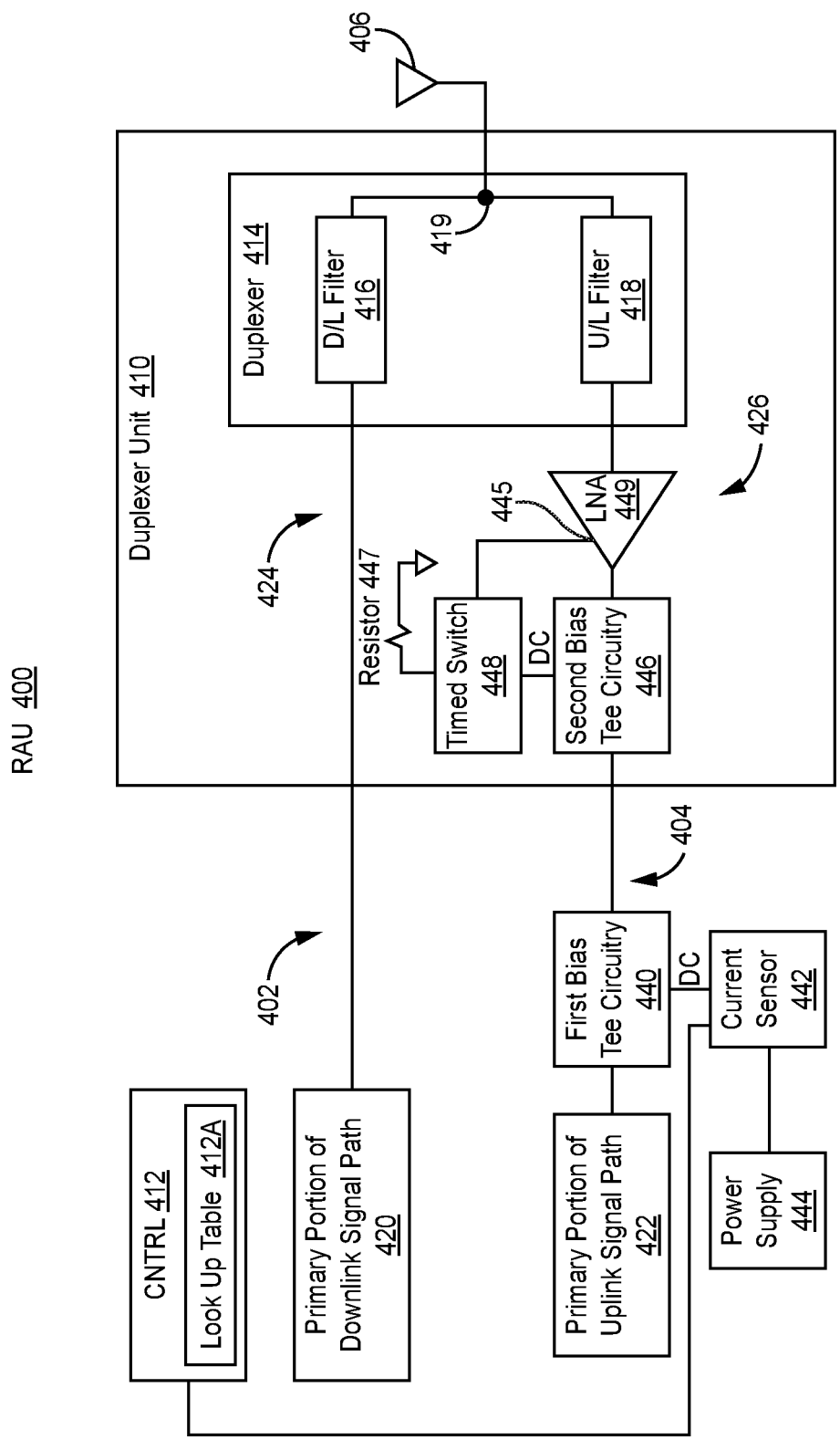
FIG. 4 illustrates a block diagram of another embodiment of a remote antenna unit configured to automatically identify a type of the duplexer.

As discussed above, the duplexer unit may include an LNA. Duplexer unit type can also be identified based upon characteristics of the current drawn by the LNA in the duplexer unit. FIG. 4 illustrates a block diagram of another embodiment of a remote antenna unit 400 configured to automatically identify a type of the duplexer. In this embodiment, the controller (CNTRL) 412 (or controller circuitry) evaluates a characteristic (unique to each duplexer unit type) of current drawn by an LNA 449 (in the duplexer unit 410) from, e.g. a power supply 444 or the controller 412, and based on the characteristic affects adjustments in component(s) of the downlink signal path 402 and/or the uplink signal path 404 of the remote antenna unit 400 to compensate for insertion loss(es) of the downlink filter 416 and/or the uplink filter 418 of the duplexer unit 410. The characteristics of current may be a current level drawn by the duplexer unit 410 during an initial fixed time period or a length of a time period when current is initially drawn by the duplexer unit 410.

The remote antenna unit 400 comprises a downlink signal path 402 and an uplink signal path 404. The implementation of the remote antenna unit 400 is similar to the remote antenna unit 100 described with respect to FIG. 1, except that the remote antenna unit 400 of FIG. 4 differs as described below. Optionally, the controller 412 includes a look up table 412A. The remote antenna unit 400 includes a power supply 444, a first bias tee circuit 440, a current sensor (or current sensor circuitry) 442, a second bias tee circuitry 446, a timed switch 448, resistor 447, and LNA 449 having a DC port 445. An RF signal port of the first bias tee circuitry 440 is configured to be coupled to the primary uplink signal path 442. A RF signal and DC power port of the first bias tee circuitry 440 is configured to be coupled to the uplink signal path input port of the duplexer unit 410, and thus a RF signal and DC power port of the second bias tee circuitry 446. The DC power port of the first bias tee circuitry 440 is configured to be coupled to an output port of the power supply 444. Optionally, the output port or other output port(s) of the power supply 202D are configured to provide DC power to at least one of the controller 412, the primary uplink signal path 420, and the primary downlink signal path 422.

Through its RF signal and DC power port, the first bias tee circuitry 440 is configured to provide both a radio frequency signal(s) (each having a carrier frequency anywhere in the very low frequency band through the extremely high frequency band) and DC power (from the power supply 444) to the duplexer unit 410, e.g. the RF signal and DC power port of the second bias tee circuitry 446. Bias tee circuitry may comprise a path through only radio frequency signals propagate (e.g. a series capacitor) and a path through which only DC power flows (e.g. a shunt inductor coupled to the series capacitor).

The current sensor 442 is coupled between the output port of the power supply 444 and the DC port of the first bias tee circuitry 440. The current sensor 442 is configured to measure the current drawn from the power supply 444 by the duplexer unit 410.

The duplexer unit 410 comprises a duplexer 414, the LNA 449, the second bias tee 446, the timed switch (or timed switch circuitry) 448, and the resistor 447. Optionally, a bus couples the timed switch 448 to the controller 412; the controller 412 generates control signal(s) (coupled to a control port of the timed switch 448) to control the position of the timed switch 448, e.g. in lieu of relying upon a timer in the timed switch. The duplexer unit 410 comprises a secondary downlink signal path 424 and a secondary uplink signal path 426.

An RF signal and DC power port of the second bias tee circuitry 446 is configured to receive an RF signal and DC power from the first bias tee circuitry 440. The DC power is coupled through the timed switch 448 to at least one of a DC port (or DC power input port) 445 of the LNA 449 and the resistor 447. The input port of the LNA 449 is configured to be coupled to an output port of the duplexer 414, e.g. an output port of the uplink filter 418.

In one embodiment, the duplexer unit 410 comprises both the timed switch 448 and the resistor 447. The timed switch 448, for example, in this embodiment is a single pole double throw switch. When the first bias tee circuitry 440 is coupled to the duplexer unit 410 or when the power supply 444 is activated, DC power is supplied to the timed switch 448 through the second bias tee circuitry 446 from the power supply 444. Upon receipt of the DC power and for a time period (e.g. a fixed period of time that is the same for all duplexer unit types), the timed switch defaults coupling its common port to a first switch port (first switch pole) coupled to the resistor 447 When the time period ends, the timed switch 448 couples the common port to a second switch port (second switch pole) coupled to the DC power input port 445 of the LNA 449. Then, with DC power provided to the DC power input port 445, the 449 is powered, and becomes operable.

The DC voltage of the power supply 444 is fixed to a level V. Each duplexer unit type has a unique resistance value R of the resistor 447. Thus, each duplexer unit type has a unique current drawn by the resistor 447 during the time period. During at least the time period, the current sensor 442 in the remote antenna unit 400 measures the current level drawn by the duplexer unit 410, e.g. the resistor 447. The current sensor 442 is configured to be coupled to, e.g. by the bus or another bus, and to provide the measured current level to the controller 412. The controller 412 is configured to determine the adjustments to signal power level in the downlink signal path 402 and/or the uplink signal path 404 of the remote antenna unit 400, e.g. using the look up table 412A, and then affect the adjustments in component(s) of such downlink signal path 402 and/or such uplink signal path 404. The look up table 412A includes current levels and/or current level ranges and corresponding adjustments, and optionally corresponding duplexer unit types.

The controller 412 can determine when the fixed period of time commences based upon the measured current changing from zero to a non-zero level. The controller 412 can determine when the fixed period of time terminated by being programmed with the fixed period of time, or upon detecting a change between non-zero current levels, i.e. to the level drawn by the LNA 449. In another embodiment, the resistance of the resistor 447 is the same for each duplexer unit type. However, the time period (during which DC power is supplied from the timed switch 448 to the resistor 447 rather than to the LNA 449) differs for each duplexer unit type. In this embodiment, current drawn by the LNA 449 is also measured and provided to the controller as described above. However, the controller 412 determines the period of time between a first time when the current drawn by the LNA changes from zero to a first level, and a second time when the current level changes between two non-zero values, i.e. to the level drawn by the LNA 449. In this embodiment, the current level drawn by the LNA 449 is sufficiently different than the current level drawn by the resistor 447 so that the controller 412 can determine the change in current draw. The controller 412 is configured to determine the adjustments to signal power level in the downlink signal path 402 and/or the uplink signal path 404, e.g. using the look up table 412A and then to affect the adjustments in component(s) of the downlink and/or the uplink paths. The look up table 412A includes times and/or time ranges and corresponding adjustments, and optionally corresponding duplexer unit types.

Alternatively, the adjustments to components of the downlink and/or the uplink paths can be determined by determining the insertion loss of the downlink filter 416 and uplink filter 418 of a duplexer unit 410. Further, alternatively, the duplexer unit 410 can be identified by determining the passband of one or both such filters of the duplexer unit 410.

Figure 5A:
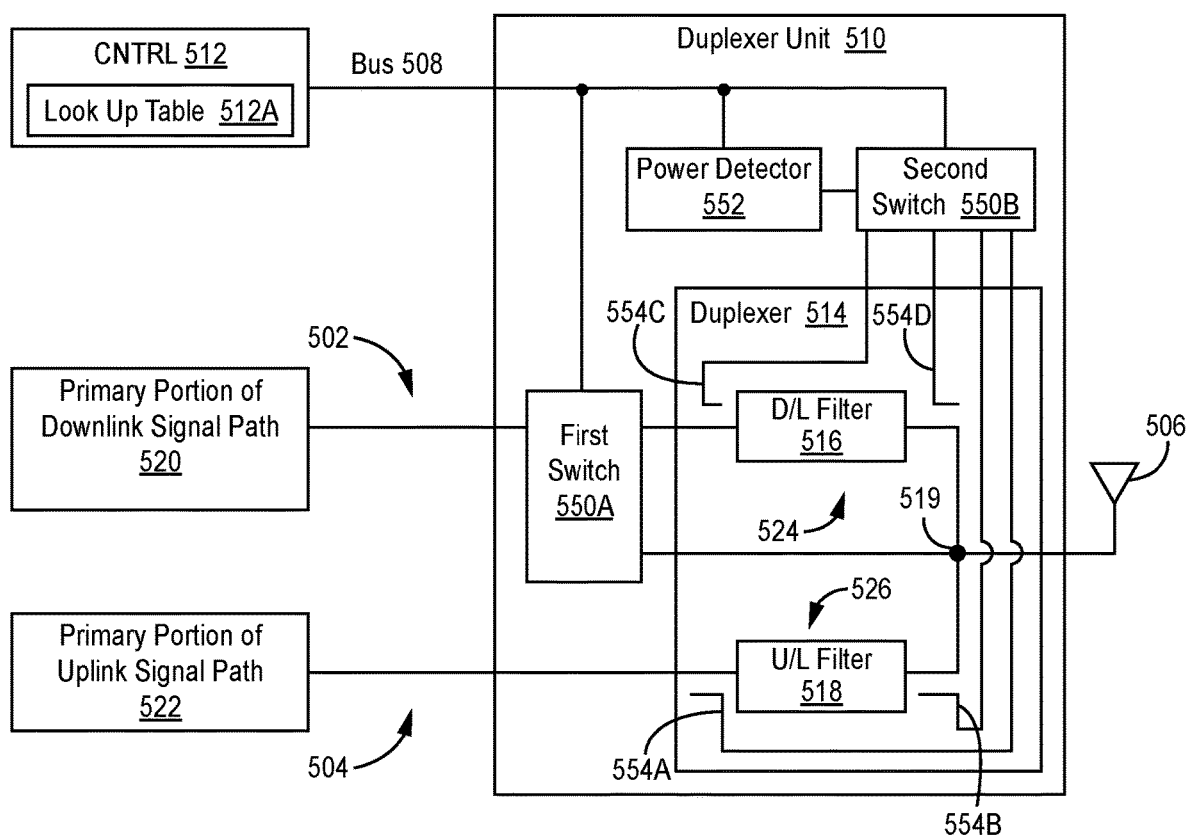
FIG. 5A illustrates a block diagram of an embodiment of remote antenna unit configured to automatically determine adjustments to downlink and/or the uplink paths by determining the insertion loss of the downlink and/or uplink filters of a duplexer.

FIG. 5A illustrates a block diagram of an embodiment of a remote antenna unit 500 configured to automatically determine adjustments to downlink and/or the uplink paths by determining the insertion loss of the downlink and/or uplink filters of a duplexer. The implementation of the remote antenna unit 500A is similar to the remote antenna unit 100 described with respect to FIG. 1, except that the remote antenna unit 500A of FIG. 5A differs as described below.

The remote antenna unit 500A comprises a downlink signal path 502 and an uplink signal path 504. Optionally, the controller (CNTRL) 512 (or controller circuitry) includes a look up table 512A. The duplexer unit 510 comprises a first switch 550A, a second switch 550B, a power detector 552, and a duplexer 514. The duplexer 514 includes a first directional coupler 554A, a second directional coupler 554B, a third directional coupler 554C, and a fourth directional coupler 554D; however, one or more of these directional couplers and/or active devices (power detector 552, first switch 550A, and/or second switch 550B) may be located external to the duplexer 514. The duplexer unit 510 also comprises a secondary downlink signal path 524 and a secondary uplink signal path 526.

Figure 5B:
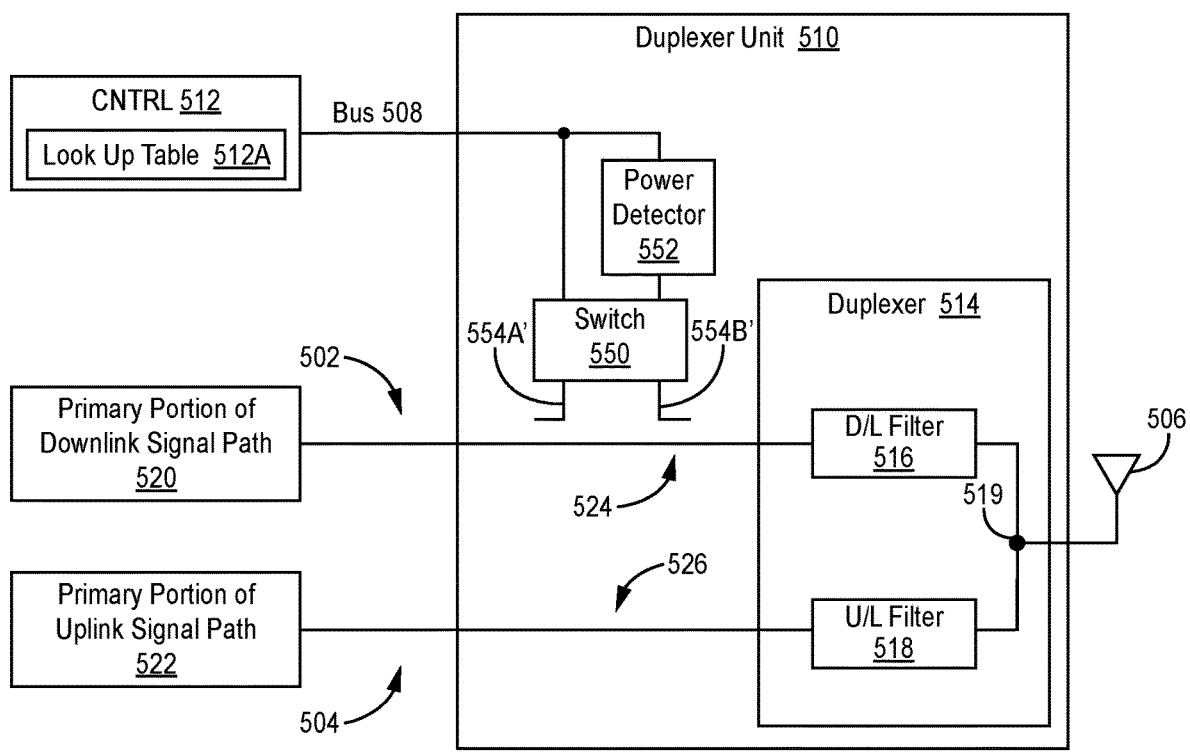
FIG. 5B illustrates a block diagram of an embodiment of a remote antenna unit configured to automatically determine adjustments to component(s) of downlink and/or the uplink paths by determining a return loss of an input port of the downlink filter of a duplexer.
Figure 5C:
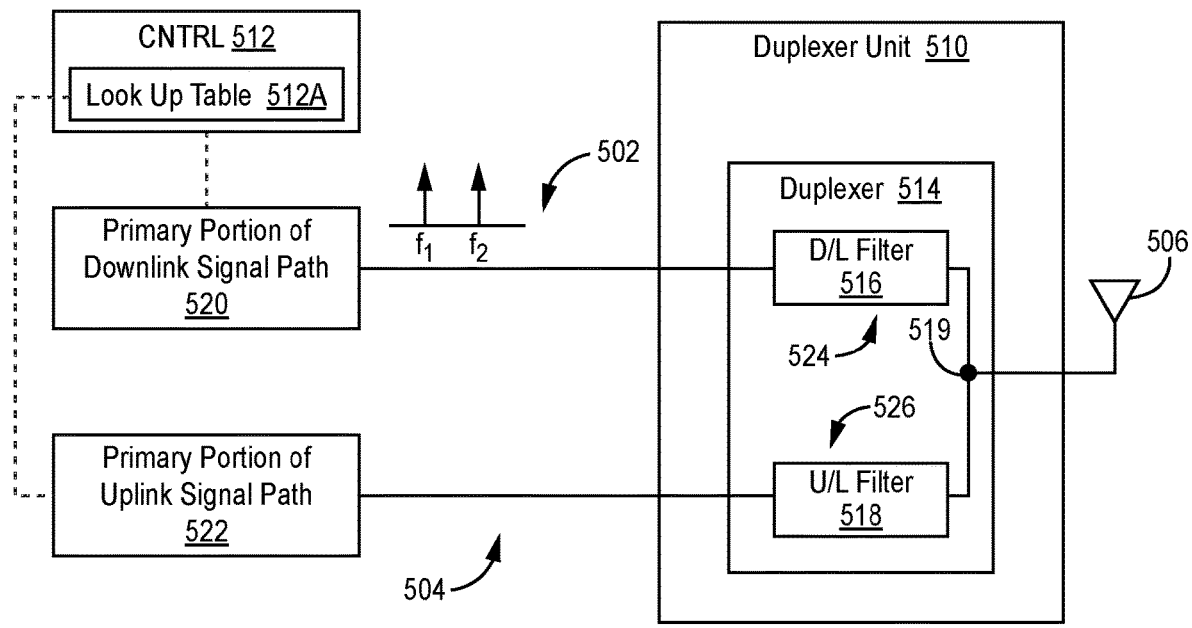
FIG. 5C illustrates a block diagram of an embodiment of a remote antenna unit configured to automatically determine adjustments to component(s) of the downlink and/or the uplink paths using passive intermodulation distortion to characterize the passbands of the downlink filter and the uplink filter of the duplexer.

For the embodiments described with respect to FIGS. 5A-C, the common port 519 of the duplexer 514 is terminated with a matched impedance, e.g. of the at least one antenna 506 or dummy load, which provides a relatively low return loss at the common port 519. In some embodiments of the invention, e.g. the embodiments described with respect to FIGS. 5A-5C, the controller 512 determines whether or not the common port 519 is terminated with a matched impedance and/or whether or not the duplexer unit 510 is properly connected to the primary downlink and/or uplink signal paths 520 and 522—based upon whether expected data is measured. If the controller 512 determines that the common port 519 is not terminated with a matched impedance and/or the duplexer unit 510 is not properly connected to the primary signal path(s), then the controller 512 alerts an installer or communications system operator by an alarm with may be an audio, visual, or textual alarm notification. Also, for the embodiments described with respect to FIGS. 5A and 5B, components, such as the power detector(s) and switch(es) may be located elsewhere in the corresponding system, e.g. in the primary downlink signal path 520 and/or the primary uplink signal path 522.

In one embodiment, the first switch 550A is a single pole double throw switch. The common port of the first switch 550A is coupled to the downlink signal path input port of the duplexer unit 510, and thus the output port of the primary downlink signal path 520. A first port of the first switch 550A is coupled an input port of the downlink filter 516. A second port of the first switch 550A is coupled the common port 519 of the duplexer 514, e.g. the output port of the downlink filter 516 and the input port of the uplink filter 518. Optionally, a control port of the first switch 550A is coupled to the controller 512 through the bus 508 so that the controller 512 can set the position of the first switch 550A to specific port (or pole).

In one embodiment, the second switch 550B is a four-pole single throw switch. The common port of the second switch 550B is coupled to the power detector 552. The first, second, third, and fourth ports (or poles) are respectively coupled to the first directional coupler 554A, the second directional coupler 554B, the third directional coupler 554C, and the fourth directional coupler 554D. Optionally, a control port of the second switch 550B is coupled to the controller 512 through the bus 508 so that the controller 512 can set the position of the second switch 550B to specific port (or pole). Alternatively, other configurations of directional couplers and power detectors can be used as an alternative to the embodiment illustrated in FIG. 5A. For example, in lieu of using the second switch 550B and the single power detector 552, four power detectors can be used where each such power detector is coupled to a unique directional coupler; each of the four power detectors would be coupled to the controller 552 through the bus 508.

Each pair of directional couplers coupled to the input and the output ports of each of the downlink filter 516 and the uplink filter 518 are each configured to sample a portion of the signal incident at the input and the output ports of the corresponding filter. The sampled signal is hereinafter referred to as the coupled signal and is provided at the coupled port of the corresponding directional coupler. The amount, and thus the relative power level, of the coupled signal with respect to the incident signal is determined by the coupling factor of the directional coupler. The power detector 552 is configured to measure the power level of each of sampled signals.

After coupling the primary downlink signal path 520 and the primary uplink signal path 522 to the duplexer unit 510 or activating a power supply that powers the active components in the duplexer unit 510, the following occurs automatically or manually (e.g. upon an equipment installer issuing a command on a terminal or by actuating a switch). The controller 512 commands, e.g. through bus 508, the first switch 550A to couple the common port of the first switch 550A to the second port (second pole) of the first switch 550A. Thus, the primary downlink signal path 520, is coupled to the common port 519 of the duplexer 514. To measure the insertion loss of the uplink filter 518, the primary downlink signal path 520 generates a periodically swept continuous wave (CW) signal over a frequency band including passbands of uplink filters of all possible duplexer unit types. The CW signal may be swept in frequency increments rather than continuously. The first directional coupler 550A and the second directional coupler 550B generate coupled signals respectively at the output and the input ports of the uplink filter 518B. Each coupled signal is sequentially coupled to the power detector 552, e.g. when the controller 512 commands the second switch 550B to switch between the respective poles coupled to the first directional coupler 554A and the second directional coupler 554B. The power level of the coupled signals at the output and the input ports is measured, e.g. sequentially, by the power detector 552 at each frequency. The controller 512 is configured to receive, through the bus 508 from the power detector 552, the power levels of the coupled signals at the output and the input port of the uplink filter 518. The controller 512 determines the insertion loss of the uplink filter 518 at each frequency by subtracting the power level of the coupled signal at the output port from the power level of the coupled signal at the input port. The controller 512 is further configured to determine the passband, e.g. the three-decibel bandwidth of the uplink filter 518, utilizing the determined insertion loss for some or all of the frequencies where measurements were made.

Upon completion of measuring the power level of the coupled signals at the output and the input port of the uplink filter 518, the controller 512 is configured to command the first switch 550A to couple the common port of the first switch 550A to the first port (first pole) of the first switch 550. (Note, measurements at the ports of the downlink filter may be performed prior to measurements at the ports of the uplink filter as long as the first switch 550A is configured to couple its common port to its first port after all measurements have been taken.) Thus, the primary downlink signal path 520 is coupled to the input port of the downlink filter 516 of the duplexer 514.

A similar process as described above is followed. To measure the insertion loss of the downlink filter 516, the primary downlink signal path 520 generates a periodically swept continuous wave (CW) signal over a frequency band including passbands of downlink filters of all possible duplexer unit types. Again, the CW signal may be swept in frequency increments rather than continuously. The third directional coupler 554C and the fourth directional coupler 554D generate coupled signals respectively at the output and the input port of the downlink filter 516. Each coupled signal is sequentially coupled to the power detector 552, e.g. when the controller 512 commands the second switch 550B to switch between the respective poles coupled to the third directional coupler 554A and the fourth directional coupler 554B. The power level of the coupled signals at the output and the input ports is measured, e.g. sequentially, by the power detector 552 at each frequency. The controller 512 is configured to receive, through the bus 508 from the power detector 552, the power levels of the coupled signals at the output and the input ports of the downlink filter 516. The controller 512 determines the insertion loss of the downlink filter 516 at each frequency by subtracting the power level of the coupled signal at the output port from the power level of the coupled signal at the input port. The controller 512 is further configured to determine the passband, e.g. the three-decibel bandwidth of the downlink filter 516.

Based upon the determined passband and measured insertion loss in the pass band of each filter, the controller 512 to automatically determine adjustments to the components of the downlink and/or the uplink paths as described elsewhere herein. In one embodiment, the controller 512 include state functions that translate the insertion losses of the downlink filter 516 and/or the uplink filter 518 into adjustments respectively in the downlink signal path 502 and/or the uplink signal path 504.

Alternatively, the controller 512 may include a look up table 512A including the passbands and/or insertion losses for one or both filters in the duplexer unit 510. Thus, measurements may be made of one or both filters. In this embodiment, the controller 512 compares at least one of the passbands and/or insertion losses for at least one of the filters of the duplexer unit 512 against data in the table corresponding to different duplexer unit types. Upon identifying a duplexer unit type by matching the at least one of the passbands and/or insertion losses for the at least one of the filters of the duplexer unit 510, the controller 512 affects adjustments respectively in the downlink signal path 502 and/or the uplink signal path 504.

If duplexer unit type is determined, e.g. using a look up table, if each duplexer unit type has a unique pass band for each filter in the duplexer unit 510, then only the insertion loss (and/or return loss) need be measured for one filter in the duplexer unit 510; the passband information for the other filter can be obtained from, e.g. the look up table. As a result, the first switch 550A, the first directional coupler 554A, and the second directional coupler 554B are not required; also, if used the second switch 550B need only be a dual pole single throw switch. Further, for any embodiment illustrated herein where duplexer unit type is identified, e.g. with a look up table, the determined duplexer unit type can be stored in the remote antenna unit 500 A for future reference by maintenance personnel or system operators.

The remote antenna units of FIGS. 5B and 5C identify duplexer unit type by determining the passband of one or both filters of the duplexer unit 510. FIG. 5B illustrates a block diagram of an embodiment of a remote antenna unit 500B configured to automatically determine adjustments to component(s) of downlink and/or the uplink paths by determining a return loss of an input port of the downlink filter 516 of a duplexer. In alternative embodiments, the return loss at the input port of the uplink filter 518 can be determined. This can be achieved by using another single pole double throw switch placed and operated like the first switch 550A in FIG. 5A. Further, two directional couplers, like directional couplers 554A' and 554B' of FIG. 5B would need to be inserted between the input port of the uplink filter 518 and the common port 519; their coupled ports would need to be coupled to the first and second ports (poles) of the switch 550. If return loss is measured at both the input ports of the downlink filter 516 and the uplink filter 516, the switch 550 would need to be a four-pole single throw switch. Further, alternatively or additionally, the return loss at an input or output port of the uplink filter 518 can also be measured.

Alternatively, for embodiments of the invention, including the embodiment illustrated in FIG. 5A, the switch 550 can be replaced by additional power detector(s) (or the switch 550 and the power detector 552 can be replaced with at least one power detector each of which can measure power levels simultaneously at more than one input) so that each directional coupler is coupled (without use of a switch) to a unique power detector or power detector input. The output of the two or more power detectors or the at least one power detector with more than one input can be coupled to the controller 512, e.g. through the bus 508. Thus, the power levels of signals from each directional coupler can be simultaneously, rather than sequentially, measured. As a result, static signals are not required to characterize the insertion loss(es) and/or return loss(es) of the downlink filter and/or uplink filter. Communication signals, e.g. from bases station(s) coupled to the DAS and/or user equipment communicating with the RAU, can be used to generate signals used in the embodiments described herein to characterize insertion and/or return loss(es) of the downlink filter and/or uplink filter. This eliminates the need to generate corresponding test signals in the RAU or DAS.

Optionally, with respect to the embodiment illustrated in FIG. 5A, only one pair of directional couplers may be employed to sample signals at an input and output of the downlink filter 516 or the uplink filter 518. These directional couplers may be coupled to power detector(s) in one of the manners described herein. As discussed elsewhere herein, if passbands of each of the uplink and downlink filters of duplexer unit types are unique, then only the passband of one filter need be characterized. The passband of the other filter can be determined using the passband of the one filter, e.g. with a look up table.

The remote antenna unit 500B of FIG. 5B is implemented and operated similar to the system 500A of FIG. 5A except that the second switch 550B has been replaced by a switch 550 and there are only a first directional coupler 554A' and a second directional coupler 554B'. In one embodiment, the switch 550 is a double pole single throw switch. Further, there is no first switch 550A.

The first directional coupler 554A' and the second directional coupler 554B' are configured to sample a portion of the signal incident at and reflected from the input port of the downlink filter 516. The power detector 552 is configured to measure the power level of each of sampled signals.

After coupling the primary downlink signal path 520 to the duplexer unit 510, the following occurs automatically or manually (e.g. upon an equipment installer issuing a command on a terminal or by actuating a switch). To measure the return loss of the downlink filter 516, the primary downlink signal path 520 generates a periodic swept continuous wave (CW) signal over a frequency band including passbands of downlink filters of all possible duplexer unit types. The CW signal may be swept in frequency increments rather than continuously. The first directional coupler 554A' and the second directional coupler 554B' generate coupled signals sampled from signals at the input port of the downlink filter 516 as described elsewhere herein. Each coupled signal is sequentially coupled to the power detector 552, e.g. when the controller 512 commands the switch 550 to switch to a corresponding pole coupled to the corresponding directional coupler. The power level of the incident and reflected coupled signals at the input port of the downlink filter 516 are measured, e.g. sequentially, by the power detector 552 at each frequency. The controller 512 is configured to receive, through the bus 508 from the power detector 552, the power levels of the incident and reflected coupled signals at the input port of the downlink filter 516. The controller 512 determines the return loss at the input port of the downlink filter 516 at each frequency. Return loss (RL) in decibels is determined using the following equation:

$$RL = 10 * \log_{10}\left(\frac{P_i}{P_r}\right) \quad \text{(Equation 1)}$$

where P is the measured power level of the incident coupled signal (in a non-decibel unit, e.g. milliwatts or watts), and Pr is the measured power level of the reflected coupled signal (in a non-decibel unit, e.g. milliwatts or watts). The controller 512 is further configured to determine the passband, e.g. the three-decibel bandwidth of the downlink filter 516, utilizing the determined return loss for some or all of the frequencies where measurements were made.

FIG. 5C illustrates a block diagram of an embodiment of a remote antenna unit 500C configured to automatically determine adjustments to component(s) of the downlink and/or the uplink paths using passive intermodulation distortion (PIMD) to characterize the passbands of the downlink filter and the uplink filter of the duplexer. The PIMD is created at the common port 519, e.g. the common port connector, of the duplexer 514.

The remote antenna unit of FIG. 5C is implemented in a manner similar to the remote antenna unit 100 of FIG. 1. After coupling the primary downlink signal path 520 and the secondary signal path to the duplexer unit 510, the following occurs automatically or manually (e.g. upon an equipment installer issuing a command on a terminal or by actuating a switch). The controller 512 is configured to cause the primary downlink signal path 520 to generate two CW signals having frequencies $f_1$ and $f_2$ which are spaced in frequency so that (a) the frequencies of both CW signals fall within a passband of downlink filters of any duplexer unit type that is configured to be coupled to the primary downlink and uplink signal paths 520 and 522, and (b) that a frequency of a second or higher order PIMD product, e.g. a third order PIMD product having a frequency equal to $2*f_2-f_1$, falls within the passband of an uplink filter of the duplexer unit type. The second or higher order PIMD product is generated as described above.

Optionally, the frequencies of the two CW signals are swept (continuously or in frequency increments) across passbands of one or more other duplexer unit types. As the frequencies of the two CW signals sweep through a pass band of another duplexer unit type, the spacing of the two CW signals is maintained so that the frequency of the second or higher order PIMD product falls within a passband of the uplink filter for the other duplexer unit type.

The out of passband rejection of the downlink filter 516 and the uplink filter 518 is relatively high, e.g. 100 dB or greater. Therefore, the primary uplink signal path 522 will only detect a second or higher order PIMD product when the two CW signals and the second or higher order PIMD product fall respectively within passbands of respectively the downlink filter 516 and the uplink filter 518. Upon detecting a second or higher order PIMD product, the primary uplink signal path 520 provides the controller 512 with one or more sets of the frequency of the second or higher order PIMD product detected by the primary uplink signal path 522 and/or the frequencies of the pair of CW signals giving rise to the detected second or higher order PIMD product. Using the look up table 512A, the controller can ascertain adjustments to be made to the components of the downlink and/or the uplink paths and can affect those adjustments based upon the passbands in which such frequencies fall within. Optionally, the controller 512 can ascertain from the look up table 512A the type of duplexer unit 510 to which the primary downlink and uplink signal paths 520 and 522 are coupled.

Figure 6:
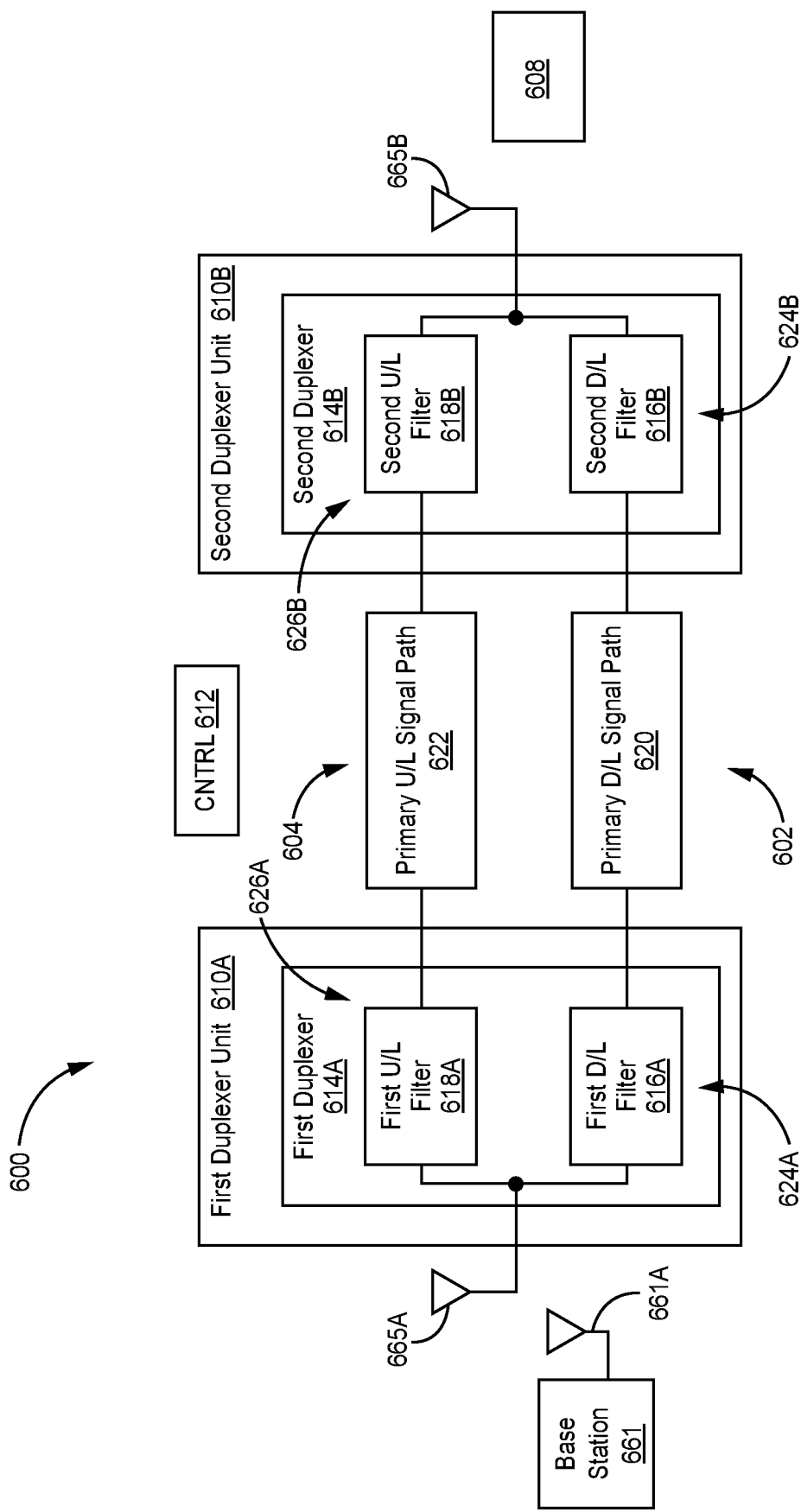
FIG. 6 illustrates a block diagram of one embodiment of a single-node repeater configured to use automatic duplexer identification techniques.

Repeater devices can be implemented in other ways. For example, a repeater device can be implemented as a single-node repeater. FIG. 6 illustrates a block diagram of one embodiment of a single-node repeater 600 configured to use the automatic duplexer identification techniques described above.

The single-node repeater 600 is configured to facilitate wireless communications between one or more base stations 661 and user equipment 608 (e.g. a mobile phone, tablet, or computer). Such wireless communication can be through an uplink signal path 604 to the base station(s) 661 and a downlink signal path 602 to the user equipment 608.

The single-node repeater 600 is configured to repeat signals communicated between one or more base stations 661 and to user equipment 608 (e.g. a mobile phone, tablet, or computer). The single-node repeater 600 comprises a first duplexer unit 610A, a second duplexer unit 610B, a primary uplink signal path 622, a primary downlink signal path 620, a donor antenna 665A, and a coverage antenna 655B. Optionally, the single-node repeater 600 comprises a controller 612. The first duplexer unit 610A, the second duplexer unit 610B, the primary uplink signal path 622, and the primary downlink signal path 620 are configured to be implemented using one of the embodiments described above; however, the techniques described above are not used in a remote antenna unit, but rather a single-node repeater 600. Further, compensation will have to be performed for both of the two duplexer units 610A and 610B rather than one duplexer unit.

The single-node repeater 600 is configured to receive one or more downlink signals from one or more base stations 661. These signals are received by the single-node repeater 661 via the donor antenna 665A. Each base station 661 has or is coupled to at least one antenna 661A for transmitting such signals. These signals are also referred to here as "base station downlink signals". Each base station downlink signal includes one or more radio frequency channels used for communicating in the downlink signal path 602 with user equipment (UE) 608 over the relevant wireless air interface. Typically, each base station downlink signal is received as an analog radio frequency signal.

The single-node repeater 600 is configured to generate one or more downlink radio frequency signals, in the primary downlink signal path 620, that are radiated from one or more coverage antennas 665B associated with the single-node repeater 600 for reception by user equipment 608. These downlink radio frequency signals are analog radio frequency signals and are also referred to here as "repeated downlink radio frequency signals." Each repeated downlink radio frequency signal includes one or more of the downlink radio frequency channels used for communicating with user equipment 608 over the wireless air interface.

Also, the single-node repeater 600 is configured to receive one or more uplink radio frequency signals, in the primary uplink signal path 622, transmitted from the user equipment 608. These signals are received by the single-node repeater 600 via the coverage antenna 665B. These signals are analog radio frequency signals and are also referred to here as "UE uplink radio frequency signals." Each UE uplink radio frequency signal includes one or more radio frequency channels used for communicating in the uplink signal path 604 with user equipment 608 over the relevant wireless air interface.

The single-node repeater 600 is also configured to generate one or more uplink radio frequency signals, in the primary uplink signal path 622, that are transmitted to the one or more base stations 600 via the donor antenna 665A. These signals are also referred to here as "repeated uplink radio frequency signals." Each repeated uplink radio frequency signal includes one or more of the uplink radio frequency channels used for communicating with user equipment 608 over the wireless air interface.

In this exemplary embodiment, the single-node repeater 600 is an active repeater system and amplifies the repeated downlink and uplink radio frequency signals it radiates from the coverage and donor antennas 665B and 665A, respectively.

Optionally, the single-node repeater system 600 also comprises a controller (CNTRL) 612 (or controller circuitry). Optionally, the controller 612 is configured to be coupled to one or more of the first duplexer unit 610A, the second duplexer unit 610B, the primary uplink signal path 622, and the primary downlink signal path 620. The controller 612 is implemented using one or more programmable processors that execute software that is configured to implement the various control functions.

In general, the first and second duplexer units 610A and 610B are implemented as described above in. Each of the first and second duplexer units 610A and 610B includes a respective first duplexer 614A and a second duplexer 614B that couple the primary downlink and uplink signal paths 620 and 622 to the antennas 655A and 655B. The single-node repeater 600 is configured so that various types of duplexer units 610A and 610B can be coupled to, included in, or otherwise used with the rest of the single-node repeater 600. In general, each of the first duplexer 614A and second duplexer 614B comprises a downlink filter 616A, 616B and an uplink filter 618A, 618B, each having a respective insertion loss. The various types of duplexer units 610A and 610B can include duplexers 614A and 614B having differing insertions losses for the respective downlink and uplink filters 616A, 616B and 618A, 618B.

The duplexer units 610A and 610B are configured and packaged in such a way that they include at least a portion of either (or both) of the downlink signal path 602 and the uplink signal path 604. The downlink signal path 602 and the uplink signal path 604 respectively comprise the primary downlink signal path 620 and the primary uplink signal path 622. The portions (if any) of the downlink and uplink signal paths 602 and 604 that are included in either duplexer unit 610A or 610B are referred to here as the "secondary portions" 624A, 624B and 626A, 626B, respectively, of the downlink and uplink signal paths 602 and 604. The primary downlink signal path 620 and the primary uplink signal path 622 may be referred to herein as the "primary portions" of respectively the downlink signal path 602 and the uplink signal path 604.

The single-node repeater 600 is configured to automatically adjust signal power levels in one or more of the downlink signal path 602 and the uplink signal path 604 in order to compensate for the insertion loss of the duplexers 614A and 614B used in the particular type of duplex units 610A and 610B. In the embodiment shown in FIG. 6, the controller 612 is configured so as to identify the particular type of duplexer units 610A and 610B that are being used with the single-node repeater 600 and to cause adjustments to be made to one or more components in the single-node repeater 600 and/or to one or more external devices (for example, the one or more base stations 661 or the user equipment 608). The adjustments are made in order to adjust the power levels in one or both of the downlink signal path 604 and/or uplink signal path 604 in order to compensate for the insertion loss of the duplexers 614A and 614B included in that type of each of the duplexer units 610A and 610B. For example, in one implementation, the controller 612 causes adjustments to be made to one or more components in one or both of the primary portion 620 of the downlink signal path 602 and the primary portion 622 of the uplink signal path 604 to compensate for the insertion loss of the duplexers 614A and 614B included in each type of the duplexer units 610A and 610B. In another example implementation, the controller 612 causes adjustments to be made to one or more components in one or more of the primary portion 620 of the downlink signal path 602, one or more secondary portion(s) 624A, 624B of the downlink signal path 602, the primary portion 622 of the uplink signal path 604, and/or one or more secondary portion(s) 626A, 626B of the uplink signal path 604 to compensate for the insertion loss of the duplexers 614A and 614B included in each type of the duplexer units 610A and 610B.

Figure 7:
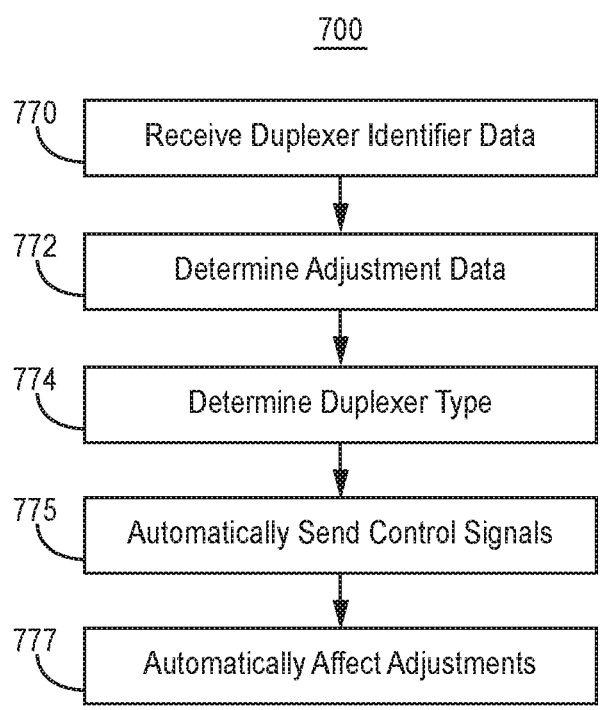
FIG. 7 illustrates a flow diagram of one embodiment of a method of using embodiments of a remote antenna unit.

FIG. 7 illustrates a flow diagram of one embodiment of a method 700 of using embodiments of communications systems made according to embodiments of the invention. To the extent that the embodiment of method 700 shown in FIG. 7 is described herein as being implemented in the systems described with respect to FIGS. 1-6, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 770, after at least one duplexer unit is coupled to a primary uplink signal path and a primary downlink signal path, receive duplexer identifier data from the at least one duplexer unit. In one embodiment, each duplexer identifier data comprises adjustment data which can be used to affect the adjustments, and optionally an identifier of the duplexer unit type (or duplexer unit type). The identifier of duplexer unit type comprises at least one of: at least one measured characteristics of the duplexer and an alpha numeric data identifier. The identifier of the duplexer unit type is unique for the corresponding duplexer unit type. The alphanumeric identifier comprises an identifier of duplexer unit type.

Optionally, in block 772, if at least one of the duplexer identifier data (ID) comprises an identifier of duplexer unit type, but not adjustment data, then determine the adjustment data corresponding to the duplexer identifier data, e.g. by using a look up table. Optionally, in block 774, if at least one of the duplexer identifier data does not include an identifier of the duplexer unit type, e.g. consists only of adjustment data or measurement data, then determine duplexer unit type based upon the corresponding adjustment data.

In block 775, based upon the adjustment data, automatically send control signals for affecting adjustment of at least one component of a communications system to compensate for the insertion losses of at least one of the downlink filter and the uplink filter of the duplexer unit. For example, the control signals can be sent wirelessly or by wired communications to the at least one component. In block 777, based upon the control signals, automatically affect the adjustments to the at least one component of a communications system comprising at least one duplexer unit, the primary uplink signal path, and the primary downlink signal path. The adjustments to the components change power level of signals in each of at least one of the uplink signal path and the downlink signal path.

The controllers described herein may include one or more microprocessors, microcontrollers, digital signal processing (DSP) elements, application-specific integrated circuits (ASICs), complex programmable logic devices, field programmable gate arrays (FPGAs), and/or memory circuitry. In one embodiment, the controller may implement a state machine or a neural network. In another embodiment, the controller includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures. Alternatively, all or part of the controller may be implemented with analog controller, e.g. implemented with operational amplifier(s).

The memory circuitry described herein can be implemented with any available storage media (or computer readable media), e.g. that can be accessed by a general purpose or special purpose computer or processor, or any programmable logic device. The storage media may include semiconductor, magnetic, and/or optical media. For example, the storage media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of storage media.

EXEMPLARY EMBODIMENTS

Example 1 includes a method for configuring downlink and uplink signal paths, the method comprising: after at least one duplexer unit is coupled to a primary uplink signal path and a primary downlink signal path, receiving duplexer identifier data from each at least one duplexer unit, where each duplexer identifier data comprises at least one of: adjustment data corresponding to the duplexer unit type and an identifier of duplexer unit type, wherein the identifier of duplexer unit type comprises at least one of: at least one measured characteristics of the corresponding duplexer unit and an alphanumeric data identifier, and where the identifier of the duplexer unit type is unique for a corresponding duplexer unit type; if at least one duplexer identifier data does not include adjustment data, then determining adjustment data based upon the corresponding duplexer identifier data; and based upon the adjustment data, automatically sending control signals for affecting adjustment of at least one component of the downlink and uplink signal paths to compensate for the insertion losses of a downlink filter and an uplink filter of each duplexer unit, where the downlink signal path comprises a secondary downlink signal path in each of the at least one duplexer unit and the primary downlink signal path, and the uplink signal path comprises a secondary uplink signal path in of the at least one duplexer unit and the primary uplink signal path.

Example 2 includes the method of Example 1, further comprising: based upon the control signals, automatically affecting the adjustments to at least one other component of the downlink and uplink signal paths.

Example 3 includes the method of any of Examples 1-2, wherein determining the adjustment data based upon the corresponding duplexer identifier data comprises determining adjustment data based upon the corresponding duplexer identifier data using a look up table.

Example 4 includes the method of any of Examples 1-3, wherein the alphanumeric data comprises an identifier of duplexer unit type.

Example 5 includes the method of any of Examples 1-4, further comprising determining at least one identifier of duplexer unit type from corresponding duplexer identifier data using a look up table.

Example 6 includes the method of any of Examples 1-5, wherein the at least one measured characteristic of the duplexer unit comprises at least one of: insertion loss of at least one filter in the duplexer unit, return loss of at least one filter in the duplexer unit, at least one characteristic of duplexer unit passive intermodulation distortion, at least one characteristic of current drawn by the duplexer unit, and regulated voltage level provided by the duplexer unit.

Example 7 includes an apparatus, comprising: a duplexer unit, comprising: a secondary downlink signal path comprising a downlink filter comprising an input port and an output port; a secondary uplink signal path comprising an uplink filter comprising an input port and an output port; and wherein the input port of the uplink filter and the output port of the downlink filter are coupled at a common port, where the common port is configured to be coupled to at least one antenna; wherein the duplexer unit is configured to be coupled to a primary uplink signal path and a primary downlink signal path, where a downlink signal path comprises the secondary downlink signal path and the primary downlink signal path, and the uplink signal path comprises the secondary uplink signal path and the primary uplink signal path; after the duplexer unit is coupled to a primary uplink signal path and a primary downlink signal path, the duplexer unit is configured to provide to duplexer identifier data to at least one component of the apparatus; wherein the duplexer identifier data comprises at least one of adjustment data corresponding to the duplexer unit type and an identifier of duplexer unit type, where the identifier of duplexer unit type comprises at least one of: at least one measured characteristics of the duplexer unit and an alphanumeric data identifier, and where the identifier of the duplexer unit type is unique for the corresponding duplexer unit type; and wherein the at least one component of the apparatus is configured to: if the duplexer identifier data does not include adjustment data, then determine adjustment data based upon the duplexer identifier data based upon the adjustment data; automatically sending control signals from the component of the apparatus to at least one component of the uplink signal path and the downlink signal path for affecting adjustment of the at least one component of the uplink signal path and the downlink signal path to compensate for the insertion losses of at least one of the downlink filter and the uplink filter of the duplexer unit; and based upon the control signals, automatically affecting the adjustments to the at least one component of the uplink signal path and the downlink signal path.

Example 8 includes the apparatus of Example 7, wherein the alphanumeric data comprises an identifier of duplexer unit type.

Example 9 includes the apparatus of any of Examples 7-8, wherein the at least one measured characteristic of the duplexer unit comprises at least one of: insertion loss of at least one filter in the duplexer unit, return loss of at least one filter in the duplexer unit, at least one characteristic of duplexer unit passive intermodulation distortion, at least one characteristic of current drawn by the duplexer unit, and regulated voltage level provided by the duplexer unit.

Example 10 includes the apparatus of Examples 7-9, further comprising memory circuitry comprising the duplexer identifier data, where the memory circuitry is configured to be coupled to a component of the communications circuit.

Example 11 includes the apparatus of any of Examples 7-10, further comprising: a low noise amplifier comprising an input port, an output port, and a DC bias port, where the input port is coupled to the output port of the uplink filter; bias tee circuitry comprising a RF signal and DC power port, an RF signal port, and a DC power input port, where the output port of the LNA is coupled to the RF signal port, and where the RF signal and DC power port is configured to be coupled to the primary uplink signal path; timed switch circuitry having a common port, a first switch port, and a second switch port, where the common port is coupled to the DC power input port and the second switch port is coupled to the DC bias port; a resistor coupled between the first port and ground; and wherein upon receipt by the timed switch circuitry of DC power, the timed switch circuitry is configured to for a time period, couple the common port to a first switch port; and after the time period, couple the common port to the second switch port.

Example 12 includes the apparatus of any of Examples 7-11, further comprising: a first directional coupler coupled between a downlink input port of the duplexer unit, and an input port of the downlink filter, where the first directional coupler has a first coupled port; wherein the first directional coupler is configured to sample a portion of the signal incident at the input port of the downlink filter, and provide the first sample at the first coupled port; a second directional coupler coupled between the common port and an output port of the downlink filter, where the second directional coupler has a second coupled port; wherein the second directional coupler is configured to sample a portion of the signal emitted from the output port of the downlink filter, and provide the second sample at the second coupled port; at least one power detector circuit configured to be coupled to the first coupled port and the second coupled port; and wherein the at least one power detector circuit is configured to measure the power levels of each of the sampled signals.

Example 13 includes the apparatus of Example 12, further comprising: a third directional coupler coupled between an uplink output port of the duplexer unit, and an output port of the uplink filter, where the third directional coupler has a third coupled port; wherein the third directional coupler is configured to sample a portion of the signal emitted from the output port of the uplink filter, and provide the third sample at the third coupled port; a fourth directional coupler coupled between the common port and an input port of the uplink filter, where the fourth directional coupler has a fourth coupled port; wherein the fourth directional coupler is configured to sample a portion of the signal incident at the input port of the uplink filter, and provide the fourth sample at the fourth coupled port; and wherein the at least one power detector circuit is further configured to be coupled to the third coupled port and the fourth coupled port.

Example 14 includes the apparatus of any of Examples 7-13, further comprising: a first directional coupler coupled between a downlink input port of the duplexer unit, and an input port of the downlink filter, where the first directional coupler has a first coupled port; wherein the first directional coupler is configured to sample a portion of the signal incident at the input port of the downlink filter, and provide the first sample at the first coupled port; a second directional coupler coupled between the downlink input port of the duplexer unit, and the input port of the downlink filter, where the second directional coupler has a second coupled port; wherein the second directional coupler is configured to sample a portion of the signal reflected from the input port of the downlink filter, and provide the second sample at the second coupled port; at least one power detector circuit configured to be coupled to the first coupled port and the second coupled port; and wherein the at least one power detector circuit is configured to measure the power levels of the sampled signals.

Example 15 includes the apparatus of any of Examples 7-14, further comprising: the primary uplink signal path; the primary downlink signal path; and a controller circuit configured to: receive duplexer identifier data from the duplexer unit, where the duplexer identifier data comprises at least one of adjustment data corresponding to the duplexer unit type and an identifier of duplexer unit type, wherein the identifier of duplexer unit type comprises at least one of: at least one measured characteristics of the duplexer unit and an alphanumeric data identifier, and where the identifier of the duplexer unit type is unique for the corresponding duplexer unit type; if the duplexer identifier data does not include adjustment data, then determine adjustment data based upon the duplexer identifier data; and based upon the adjustment data, automatically sending control signals for affecting adjustment of at least one component of the downlink signal path and the uplink signal path to compensate for the insertion losses of at least one of the downlink filter and the uplink filter of the duplexer unit.

Example 16 includes the apparatus of Example 15, wherein the alphanumeric data comprises an identifier of duplexer unit type; and wherein the duplexer identifier data comprises at least one of adjustment data corresponding to the duplexer unit type and an identifier of duplexer unit type, where the identifier of duplexer unit type comprises at least one of: at least one measured characteristics of the duplexer unit and an alphanumeric data identifier, and where the identifier of the duplexer unit type is unique for the corresponding duplexer unit type.

Example 17 includes an apparatus, comprising: a primary uplink signal path; a primary downlink signal path, where the primary uplink signal path and the primary downlink signal path are configured to be coupled to a duplexer unit, where the duplexer unit comprises a secondary downlink signal path and a secondary uplink signal path, where the downlink signal path comprises the primary downlink signal path and the secondary downlink signal path, and where the uplink signal path comprises the primary uplink signal path and the primary downlink signal path; a controller circuit configured to: receive duplexer identifier data from a duplexer unit, where the duplexer identifier data comprises at least one of adjustment data corresponding to the duplexer unit type and an identifier of duplexer unit type, wherein the identifier of duplexer unit type comprises at least one of: at least one measured characteristics of the duplexer unit and an alphanumeric data identifier, and where the identifier of the duplexer unit type is unique for the corresponding duplexer unit type; if the duplexer identifier data does not include adjustment data, then determine adjustment data based upon the duplexer identifier data; and based upon the adjustment data, automatically sending control signals for affecting adjustment of at least one component of a downlink signal path and an uplink signal path to compensate for the insertion losses of at least one of the downlink filter and the uplink filter of the duplexer unit.

Example 18 includes the apparatus of Example 17, wherein the alphanumeric data comprises an identifier of duplexer unit type.

Example 19 includes the apparatus of any of Examples 17-18, wherein the duplexer identifier data comprises at least one of adjustment data corresponding to the duplexer unit type and an identifier of duplexer unit type, where the identifier of duplexer unit type comprises at least one of: at least one measured characteristics of the duplexer unit and an alphanumeric data identifier, and where the identifier of the duplexer unit type is unique for the corresponding duplexer unit type.

Example 20 includes the apparatus of any of Examples 17-19, wherein the controller comprises a look up table.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. Therefore, it is manifestly intended that this invention be limited only by the claims and the equivalents thereof.

The invention claimed is:

1. A method for configuring a downlink signal path and an uplink signal path, the method comprising:
    after at least one duplexer unit is coupled to a primary uplink signal path and a primary downlink signal path, receiving duplexer identifier data from each at least one duplexer unit, wherein each duplexer identifier data comprises at least one of: adjustment data corresponding to a type of a duplexer unit and an identifier of the type of the duplexer unit,
    wherein the identifier of the type of the duplexer unit comprises at least one of: at least one measured characteristic of a corresponding duplexer unit and an alphanumeric data identifier, and wherein the identifier of the type of the duplexer unit is unique for a corresponding type of duplexer unit;
    if at least one duplexer identifier data does not include the adjustment data, then determining the adjustment data based upon corresponding duplexer identifier data; and
    based upon the adjustment data, automatically sending control signals for affecting adjustment of at least one component of the downlink signal path and the uplink signal path to compensate for insertion losses of a downlink filter and an uplink filter of each duplexer unit, wherein the downlink signal path comprises a secondary downlink signal path in each of the at least one duplexer unit and the primary downlink signal path, and the uplink signal path comprises a secondary uplink signal path in each of the at least one duplexer unit and the primary uplink signal path.

2. The method of claim 1, further comprising:
    based upon the control signals, automatically affecting the adjustment of at least one other component of the downlink and the uplink signal paths.

3. The method of claim 1, wherein determining the adjustment data based upon the corresponding duplexer identifier data comprises determining the adjustment data based upon the corresponding duplexer identifier data using a look up table.

4. The method of claim 1, wherein the alphanumeric data identifier comprises an identifier of the type of the duplexer unit.

5. The method of claim 1, further comprising determining at least one identifier of the type of the duplexer unit from the corresponding duplexer identifier data using a look up table.

6. The method of claim 1, wherein the at least one measured characteristic of the duplexer unit comprises at least one of: insertion loss of at least one filter in the duplexer unit, return loss of at least one filter in the duplexer unit, at least one characteristic of duplexer unit passive intermodulation distortion, at least one characteristic of current drawn by the duplexer unit, and regulated voltage level provided by the duplexer unit.

7. An apparatus, comprising:
a duplexer unit, comprising:
a secondary downlink signal path comprising a downlink filter comprising an input port and an output port;
a secondary uplink signal path comprising an uplink filter comprising an input port and an output port;
wherein the input port of the uplink filter and the output port of the downlink filter are coupled at a common port, wherein the common port is configured to be coupled to at least one antenna;
wherein the duplexer unit is configured to be coupled to a primary uplink signal path and a primary downlink signal path, wherein a downlink signal path comprises the secondary downlink signal path and the primary downlink signal path, and an uplink signal path comprises the secondary uplink signal path and the primary uplink signal path;
after the duplexer unit is coupled to the primary uplink signal path and the primary downlink signal path, the duplexer unit is configured to provide to duplexer identifier data to at least one component of the apparatus; and
wherein the duplexer identifier data comprises at least one of adjustment data corresponding to a type of the duplexer unit and an identifier of the type of the duplexer unit, wherein the identifier of the type of the duplexer unit comprises at least one of: at least one measured characteristic of the duplexer unit and an alphanumeric data identifier, and wherein the identifier of the type of the duplexer unit is unique for a corresponding type of the duplexer unit;
wherein the at least one component of the apparatus is configured to:
if the duplexer identifier data does not include the adjustment data, then determine the adjustment data based upon corresponding duplexer identifier data;
automatically sending control signals from the at least one component of the apparatus to at least one component of the uplink signal path and the downlink signal path for affecting adjustment of the at least one component of the uplink signal path and the downlink signal path to compensate for insertion losses of at least one of the downlink filter and the uplink filter of the duplexer unit; and
based upon the control signals, automatically affecting the adjustment of the at least one component of the uplink signal path and the downlink signal path.

8. The apparatus of claim 7, wherein the alphanumeric data identifier comprises an identifier of the type of duplexer unit.

9. The apparatus of claim 7, wherein the at least one measured characteristic of the duplexer unit comprises at least one of: insertion loss of at least one filter in the duplexer unit, return loss of at least one filter in the duplexer unit, at least one characteristic of duplexer unit passive intermodulation distortion, at least one characteristic of current drawn by the duplexer unit, and regulated voltage level provided by the duplexer unit.

10. The apparatus of claim 7, further comprising memory circuitry comprising the duplexer identifier data, wherein the memory circuitry is configured to be coupled to a component of a communications circuit.

11. The apparatus of claim 7, further comprising:
a low noise amplifier comprising an input port, an output port, and a direct current DC) bias port, wherein the input port is coupled to the output port of the uplink filter;
bias tee circuitry comprising a radio frequency (RF) signal and DC power port, an RF signal port, and a DC power input port, wherein the output port of low noise amplifier (LNA) is coupled to the RF signal port, and wherein the RF signal and DC power port is configured to be coupled to the primary uplink signal path;
timed switch circuitry having a switch common port, a first switch port, and a second switch port, wherein the switch common port is coupled to the DC power input port and the second switch port is coupled to the DC bias port; and
a resistor coupled between the first switch port and ground;
wherein upon receipt by the timed switch circuitry of DC power, the timed switch circuitry is configured to:
for a time period, couple the switch common port to the first switch port; and
after the time period, couple the switch common port to the second switch port.

12. The apparatus of claim 7, further comprising:
a first directional coupler coupled between a downlink input port of the duplexer unit, and an input port of the downlink filter, wherein the first directional coupler has a first coupled port;
wherein the first directional coupler is configured to sample a portion of a signal incident at the input port of the downlink filter, and provide a first sample at the first coupled port;
a second directional coupler coupled between the common port and an output port of the downlink filter, wherein the second directional coupler has a second coupled port;
wherein the second directional coupler is configured to sample a portion of a signal emitted from the output port of the downlink filter, and provide a second sample at the second coupled port; and
at least one power detector circuit configured to be coupled to the first coupled port and the second coupled port;
wherein the at least one power detector circuit is configured to measure a power level of each sampled signal.

13. The apparatus of claim 12, further comprising:
a third directional coupler coupled between an uplink output port of the duplexer unit, and an output port of the uplink filter, wherein the third directional coupler has a third coupled port;

wherein the third directional coupler is configured to sample a portion of a signal emitted from the output port of the uplink filter, and provide a third sample at the third coupled port;

a fourth directional coupler coupled between the common port and an input port of the uplink filter, wherein the fourth directional coupler has a fourth coupled port; and wherein the fourth directional coupler is configured to sample a portion of a signal incident at the input port of the uplink filter, and provide a fourth sample at the fourth coupled port;

wherein the at least one power detector circuit is further configured to be coupled to the third coupled port and the fourth coupled port.

14. The apparatus of claim 7, further comprising:

a first directional coupler coupled between a downlink input port of the duplexer unit, and an input port of the downlink filter, wherein the first directional coupler has a first coupled port;

wherein the first directional coupler is configured to sample a portion of a signal incident at the input port of the downlink filter, and provide a first sample at the first coupled port;

a second directional coupler coupled between the downlink input port of the duplexer unit, and the input port of the downlink filter, wherein the second directional coupler has a second coupled port;

wherein the second directional coupler is configured to sample a portion of a signal reflected from the input port of the downlink filter, and provide a second sample at the second coupled port; and at least one power detector circuit configured to be coupled to the first coupled port and the second coupled port;

wherein the at least one power detector circuit is configured to measure a power level of each sampled signal.

15. The apparatus of claim 7, further comprising:

the primary uplink signal path;

the primary downlink signal path; and a controller circuit configured to:
receive the duplexer identifier data from the duplexer unit, wherein the duplexer identifier data comprises at least one of the adjustment data corresponding to the type of the duplexer unit and the identifier of the type of the duplexer unit, wherein the identifier of the type of the duplexer unit comprises the at least one of: at least one measured characteristics of the duplexer unit and an alphanumeric data identifier, and wherein the identifier of the type of the duplexer unit is unique for the corresponding type of the duplexer unit;

if the duplexer identifier data does not include the adjustment data, then determine the adjustment data based upon the duplexer identifier data; and based upon the adjustment data, automatically sending control signals for affecting adjustment of at least one component of the downlink signal path and the uplink signal path to compensate for the insertion losses of at least one of the downlink filter and the uplink filter of the duplexer unit.

16. The apparatus of claim 15, wherein the alphanumeric data identifier comprises an identifier of a type of the duplexer unit;

wherein the duplexer identifier data comprises at least one of adjustment data corresponding to the type of the duplexer unit and an identifier of the type of the duplexer unit, wherein the identifier of the type of the duplexer unit comprises at least one of: at least one measured characteristics of the duplexer unit and an alphanumeric data identifier, and wherein the identifier of the type of the duplexer unit is unique for the corresponding type of the duplexer unit.

17. An apparatus, comprising:

a primary uplink signal path;

a primary downlink signal path, wherein the primary uplink signal path and the primary downlink signal path are configured to be coupled to a duplexer unit, wherein the duplexer unit comprises a secondary downlink signal path and a secondary uplink signal path, wherein a downlink signal path comprises the primary downlink signal path and the secondary downlink signal path, and wherein an uplink signal path comprises the primary uplink signal path and the primary downlink signal path; and a controller circuit configured to:
receive duplexer identifier data from the duplexer unit, wherein the duplexer identifier data comprises at least one of adjustment data corresponding to a type of the duplexer unit and an identifier of the type of the duplexer unit, wherein the identifier of the type of the duplexer unit comprises at least one of: at least one measured characteristics of the duplexer unit and an alphanumeric data identifier, and wherein the identifier of the type of the duplexer unit is unique for a corresponding type of the duplexer unit;

if the duplexer identifier data does not include the adjustment data, then determine the adjustment data based upon the duplexer identifier data; and based upon the adjustment data, automatically sending control signals for affecting adjustment of at least one component of a downlink signal path and an uplink signal path to compensate for insertion losses of at least one of a downlink filter of the duplexer unit and an uplink filter of the duplexer unit.

18. The apparatus of claim 17, wherein the alphanumeric data identifier comprises an identifier of the type of the duplexer unit.

19. The apparatus of claim 17, wherein the duplexer identifier data comprises at least one of adjustment data corresponding to the type of the duplexer unit and an identifier of the duplexer unit, wherein the identifier of the type of the duplexer unit comprises the at least one of: at least one measured characteristics of the duplexer unit and an alphanumeric data identifier, and wherein the identifier of the type of the duplexer unit is unique for the corresponding type of duplexer unit.

20. The apparatus of claim 17, wherein the controller circuit comprises a look up table.

* * * * *